(12) United States Patent
Seksenov et al.

(10) Patent No.: US 11,755,720 B2
(45) Date of Patent: Sep. 12, 2023

(54) SECURE MEMBRANES AND CROSS NAMESPACE COMMUNICATION

(71) Applicant: salesforce.com, inc., San Francisco, CA (US)

(72) Inventors: Kiril Seksenov, San Francisco, CA (US); Caridy Patino, San Francisco, CA (US); Manuel Jasso, San Francisco, CA (US); John-David Dalton, San Francisco, CA (US); Dejan Mihai Gitin, San Francisco, CA (US); Abika Nimmakayala, San Francisco, CA (US); Patterson Wu, San Francisco, CA (US); Theodore Lau, San Francisco, CA (US); Andrew Hoffman, San Francisco, CA (US); Nirankush Panchbhai, San Francisco, CA (US)

(73) Assignee: SALESFORCE, INC., San Francisco, CA (US)

( * ) Notice: Subject to any disclaimer, the term of this patent is extended or adjusted under 35 U.S.C. 154(b) by 298 days.

(21) Appl. No.: 16/991,969

(22) Filed: Aug. 12, 2020

(65) Prior Publication Data
US 2021/0240818 A1  Aug. 5, 2021

Related U.S. Application Data

(60) Provisional application No. 62/968,897, filed on Jan. 31, 2020.

(51) Int. Cl.
G06F 21/00 (2013.01)
G06F 21/53 (2013.01)
G06F 16/958 (2019.01)
G06F 40/12 (2020.01)

(52) U.S. Cl.
CPC ............ G06F 21/53 (2013.01); G06F 16/986 (2019.01); *G06F 40/12* (2020.01); *G06F 2221/033* (2013.01)

(58) Field of Classification Search
CPC ........ G06F 21/53; G06F 16/986; G06F 40/12; G06F 2221/033; G06F 16/972
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |

(Continued)

OTHER PUBLICATIONS

Clark, "ES modules: A cartoon deep-dive" Mozilla Hacks (Mar. 2018); 14 pages.

(Continued)

*Primary Examiner* — Ghazal B Shehni
(74) *Attorney, Agent, or Firm* — Schwabe Williamson & Wyatt

(57) ABSTRACT

Disclosed embodiments are related to information security and scripting-language technologies, and in particular, to technologies for providing secure membranes and cross namespace communication between isolated components in a scripting environment. Other embodiments may be described and/or claimed.

22 Claims, 7 Drawing Sheets

(56) References Cited

U.S. PATENT DOCUMENTS

| | | |
|---|---|---|
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteqee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 8,818,940 B2 | 8/2014 | Lai et al. |
| 9,053,136 B2 | 6/2015 | Kuruganti et al. |
| 9,715,555 B2 | 6/2017 | Doshi et al. |
| 9,703,799 B2 | 7/2017 | Kuruganti et al. |
| 10,158,638 B2 | 12/2018 | Micucci et al. |
| 10,218,667 B2 | 2/2019 | Lai et al. |
| 10,324,901 B2 | 6/2019 | Kuruganti et al. |
| 10,324,946 B2 | 6/2019 | Janson et al. |
| 11,165,753 B1 * | 11/2021 | Kawale .......... G06F 9/546 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0135509 A1 | 7/2003 | Davis |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |

(56) References Cited

U.S. PATENT DOCUMENTS

| | | |
|---|---|---|
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0005107 A1 | 1/2005 | Touboul |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2009/0249489 A1 | 10/2009 | Livshits et al. |
| 2009/0320119 A1* | 12/2009 | Hicks ................... G06Q 10/10 707/999.1 |
| 2011/0218958 A1 | 9/2011 | Warshavsky |
| 2011/0247051 A1 | 10/2011 | Bulumulla |
| 2012/0005429 A1 | 1/2012 | Kalasapur |
| 2012/0036264 A1 | 2/2012 | Jiang |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2012/0317238 A1 | 12/2012 | Beard |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2013/0305045 A1 | 11/2013 | Potekhin |
| 2014/0081953 A1 | 3/2014 | Ingram |
| 2014/0359537 A1 | 12/2014 | Jackobson et al. |
| 2015/0007251 A1 | 1/2015 | Johns |
| 2015/0213259 A1* | 7/2015 | Du .......................... G06F 21/53 726/27 |
| 2017/0200178 A1 | 7/2017 | Shiffert |
| 2018/0367572 A1 | 12/2018 | Frisbie |
| 2019/0108598 A1 | 4/2019 | Lai et al. |
| 2019/0238559 A1 | 8/2019 | Paradis et al. |
| 2019/0303563 A1* | 10/2019 | Powell ................... G06F 21/53 |
| 2020/0026739 A1 | 1/2020 | McGuire et al. |
| 2020/0250086 A1 | 8/2020 | Khan et al. |
| 2021/0056541 A1* | 2/2021 | Kim ..................... G06Q 20/326 |
| 2021/0084038 A1* | 3/2021 | Feasel ....................... G06F 9/54 |
| 2021/0150020 A1* | 5/2021 | Lewis ..................... H04L 67/63 |

OTHER PUBLICATIONS

Roberts, "Creating Lightning Components: Single Page Applications", Salesforce Developer Force Blog (Apr. 13, 2015 to May 27, 2015); 33 pages.

"ECMAScript 2020 Language Specification" EMCA-262 Standard 11th Ed. Jun. 2020; 860 pages.

"The JSON Data Interchange Syntax" EMCA-404 Standard 2nd Ed. Dec. 2017; 16 pages.

Miller et al., Safe JavaScript Modules (Dec. 22, 2019); 8 pages.

Tc39/proposals-realms explainer, downloaded from the Internet <https://github.com/tc39/proposal-realms/blob/main/explainer.md> (May 28, 2020); 20 pages.

Patino_tc39/proposals-ses, Draft proposal for SES (Secure EmcaScript) downloaded from the Internet <https://github.com/tc39/proposal-ses> (May 28, 2020); 26 pages.

Crites et al., "OMash: Enabling Secure Web Mashups via Object Abstractions", Oct. 2008.

* cited by examiner

SECURE MEMBRANES AND CROSS NAMESPACE COMMUNICATION

RELATED APPLICATIONS

The present application claims priority to U.S. Provisional App. No. 62/968,897 filed on Jan. 31, 2020, the contents of which is incorporated by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

The present disclosure relates generally to information security and scripting-language technologies, and in particular to technologies for providing isolated component execution (secure membranes) and mechanisms allowing communication between isolated component execution spaces (cross namespace communication mechanisms).

BACKGROUND

Scripting languages are programming languages that are used to manipulate, customize, and automate the facilities of a computing system, and expose the functionality of the computing system to program control through a user interface. The computing system is said to provide a host environment of objects and facilities, which completes the capabilities of the scripting language. One such scripting language is ECMAScript standardized by Ecma International in ECMA-262 and ISO/IEC 16262. ECMAScript is an object-oriented programming language for performing computations and manipulating computational objects within a host environment. Example implementations of ECMAScript include JavaScript®, Jscript, and ActionScript. Creating robust scripting language code ("scripts") becomes increasingly important as web applications become more sophisticated. The dynamic nature of ECMAScript code at runtime presents various challenges for developers.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

DETAILED DESCRIPTION

Figure 1A:
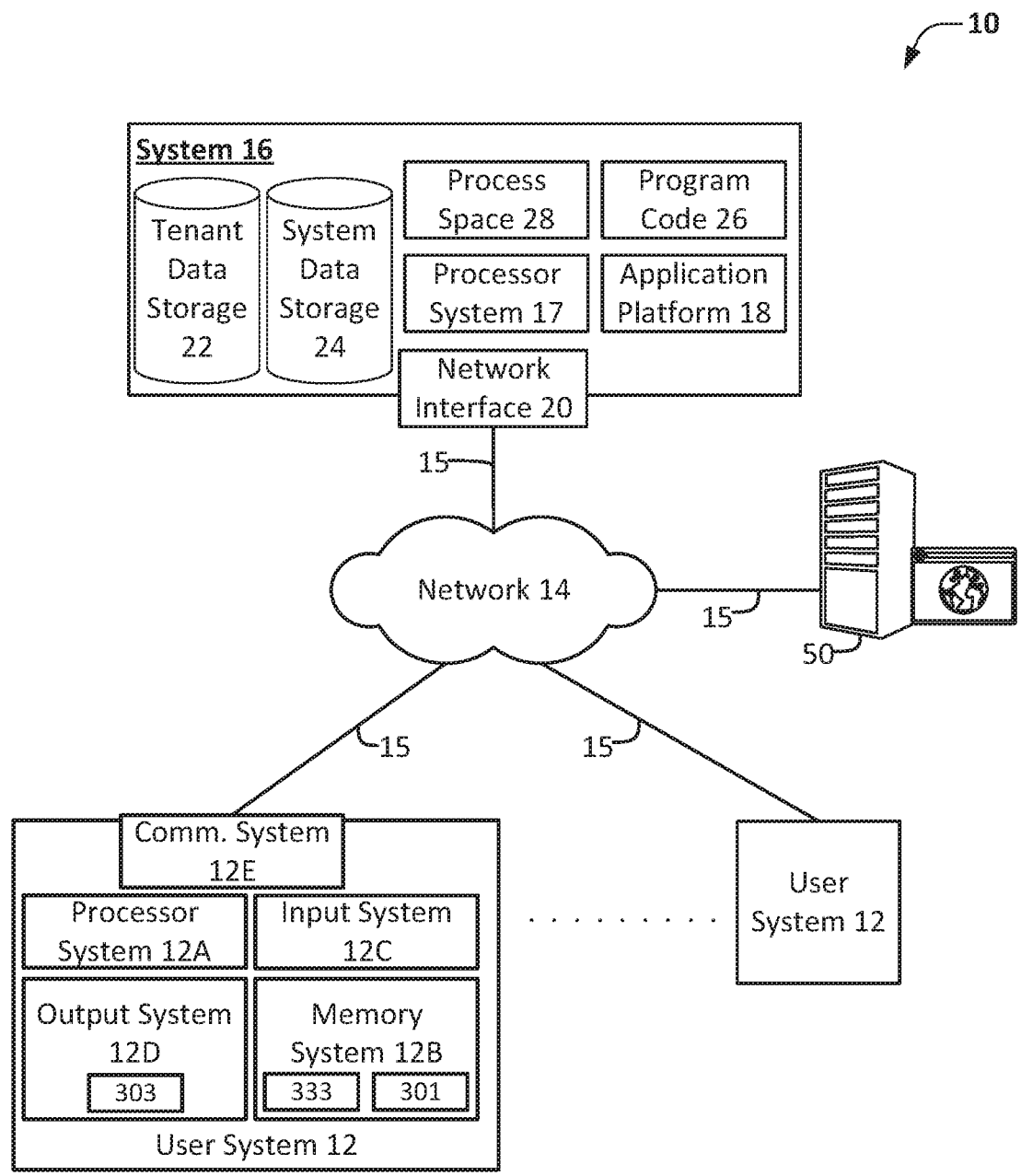
FIG. 1A shows an example environment in which an on-demand database service can be used according to various embodiments.

The present disclosure is related to providing secure isolation and communication mechanisms for application components. A computing service, such as a cloud computing sservice, a multi-tenant computing service, content delivery network, and/or the like, may provide a component framework that allows its subscribers to develop web applications (apps) and/or native apps using one or more pre-built and/or custom components. Here, "components" refer to re-usable code elements built using, for example, HTML, ECMAScript, and/or the like. The components run ontop of a computing service's application platform, and multiple components may run on the same webpage or within a same web app. These components may also come from multiple different sources and may be developed by different parties. The component model can be thought of as recreating the mobile app and app store models within a single client app (e.g., browser) and/or a web app.

Currently, there is no way to establish a trust relationship or a security model between different components running within the same web app. For example, a third party component could execute or deploy malicious code through another component in a web app, or steal personal information submitted through another component in a web app. The security measures that exist within operating systems and/or virtualization technologies cannot be reused for a component model.

Disclosed embodiments include "secure membranes" that provide a security model for components inside of a client app or web app. A secure membrane is a script execution environment or "sandbox" for one or more components that exists for the one or more components' entire lifecycle, which is the time the one or more components live on and/or interact with the client/web app until a user navigates away from the client/web app. In the context of computer security, a "sandbox" refers to a security mechanism for separating running applications of program code to prevent system failures and/or software vulnerabilities from spreading to other systems. In some embodiments, the secure membranes are implemented using HTML5 inline frames (iframes), which provide the sandbox for isolating a component's script execution. Other sandboxing technologies, such as JavaScript "realms," Java Virtual Machine (JVM) sandboxes, Linux application sandboxing, containerization, and/or the like, may also be used in other embodiments.

In embodiments, each component of a client/web app has a declared or defined namespace. The namespace for each component is detected when the web app with multiple components is loaded. At load time, a secure membrane is created for each detected namespace, and each component in a web app is wrapped in its own secure membrane. In embodiments, the script of each component is also evaluated so that scripts that interact with the web app are secure operations. In this way, each component can make changes to itself (i.e., within its own secure membrane), but cannot go across components to make potentially malicious or negative changes to other components in the web app.

As mentioned previously, secure membranes may be created using iframes. Traditional iframes live in a Document Object Model (DOM). In embodiments, the iframes used for secure membranes are detached from the DOM, which means that the iframes do not show up in the corresponding HTML. In embodiments, a handler to the detached iframes is created in the DOM. The handler acts as a secure broker that relays operations from the detached iframes back to the DOM, and vice versa. In this way, the secure membranes no longer live on the page itself. Further, each component can run and execute any script inside its own secure membrane. After the script executes, the handler can be used to determine whether a particular operation is safe and secure, or not. If the operation is secure, the handler relays strings/code back to the main page to apply changes or computations to the web app itself, but only within namespace(s) the component is allowed to make such changes or computations. Moreover, components are still allowed to change inner HTML, but strings based on executed scripts are not blindly passed to the DOM. Instead, strings are sanitized before being passed to the DOM. The sanitization involves checking a string type (e.g., what the string is), ensuring that the string is a well-formed string, and validating the string before letting the string pass to the DOM. For example, if a component tries to pass JavaScript inside of inner HTML, the handler prevents modification of the inner HTML on the main page because this is a potentially malicious use case of the DOM API.

The secure membrane embodiments discussed herein can be used to simplify component model implementations, reduce on-disk footprint (e.g., reduce memory/storage resource consumption), improve performance (e.g., reduce compute/computational resource consumption, etc.), increase compatibility with modem web standards and ecosystem code, and allow for a more secure sandbox thereby improving the security and integrity of individual components in component frameworks.

The secure membranes block script execution across multiple namespaces in a web app, which prevents components from communicating with one another. Ensuring that individual components cannot execute script across namespaces provides a security model for a component framework, but is not ideal from a usability perspective since some components may be built to interact with other components.

Disclosed embodiments also include cross namespace communication mechanisms that enable trusted, secure communication across namespaces. Usually, each component or each namespace has a manifest file specifying metadata for the component or its namespace. In embodiments, manifests are used to establish a declarative trust model among namespaces by specifying zero or more other namespaces that a component is permitted to communicate with. In these embodiments, a developer can specify specific namespaces that are allowed access to their namespace(s), specify that their namespace(s) should be completely isolated (i.e., no communications/access by other namespaces), or specify a standard (default) set of secure operations may be permitted nothing at all. In some embodiments, when nothing is specified in a namespace's manifest, the standard (default) set of secure operations may be permitted.

In embodiments, a first namespace can import a mirrored version or copy of a component inside a second namespace at runtime, where the first namespace can use the imported component but cannot modify it. If the first namespace attempts to modify the component from the second namespace, the component is copied into the first namespace as a new object that executes inside the secure membrane of the first namespace. This allows imported components to function exactly as they did before being imported without negatively effecting the behavior of the namespace from which the component is imported. Other embodiments may be described and/or claimed.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring of the disclosed implementations. Other implementations and applications are also possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods includes more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," A and C and "A, B and C."

Example embodiments of the present disclosure may be described in terms of a multitenant and/or cloud computing architecture or platform. Cloud computing refers to a paradigm for enabling network access to a scalable and elastic pool of shareable computing resources with self-service provisioning and administration on-demand and without active management by users. Computing resources (or simply "resources") are any physical or virtual component, or usage of such components, of limited availability within a computer system or network. Examples of resources include usage/access to, for a period of time, servers, processor(s), storage equipment, memory devices, memory areas, networks, electrical power, input/output (peripheral) devices, mechanical devices, network connections (e.g., channels/links, ports, network sockets, etc.), operating systems, virtual machines (VMs), software/applications, computer files, and/or the like. Cloud computing provides cloud computing services (or cloud services), which are one or more capabilities offered via cloud computing that are invoked using a defined interface (e.g., an API or the like). Multi-tenancy is a feature of cloud computing where physical or virtual resources are allocated in such a way that multiple tenants and their computations and data are isolated from and inaccessible to one another. As used herein, the term "tenant" refers to a group of users (e.g., cloud service users) who share common access with specific privileges to a software instance and/or a set of computing resources. Tenants may be individuals, organizations, or enterprises that are customers or users of a cloud computing service or platform. However, a given cloud service customer organization could have many different tenancies with a single cloud service provider representing different groups within the organization. A multi-tenant platform or architecture, such as those discussed herein, may provide a tenant with a dedicated share of a software instance typically including one or more of tenant specific data, user management, tenant-specific functionality, configuration, customizations, non-functional properties, associated applications, etc. Multi-tenancy contrasts with multi-instance architectures, where separate software instances operate on behalf of different tenants.

I. Example System Overview

FIG. 1A shows an example of an environment 10 in which on-demand services (e.g., cloud computing services and/or database services) can be used in accordance with various embodiments. The environment 10 includes user systems 12, a network 14, system 16 (also referred to herein as a "cloud-based system," "database system," "cloud computing service," or the like), and one or more customer platforms (CPs) 50. The cloud system 16 includes a processor system 17, an application platform 18, a network interface 20, tenant database (DB) 22 for storing tenant data 23 (see e.g., FIG. 1B), system DB 24 for storing system data 25 (see FIG. 1B), program code 26 for implementing various functions of the system 16, and process space 28 for executing DB system processes and tenant-specific processes, such as running applications as part of an application hosting service. In some other implementations, environment 10 may not have all of these components or systems, or may have other components or systems instead of, or in addition to, those listed above.

Figure 1B:
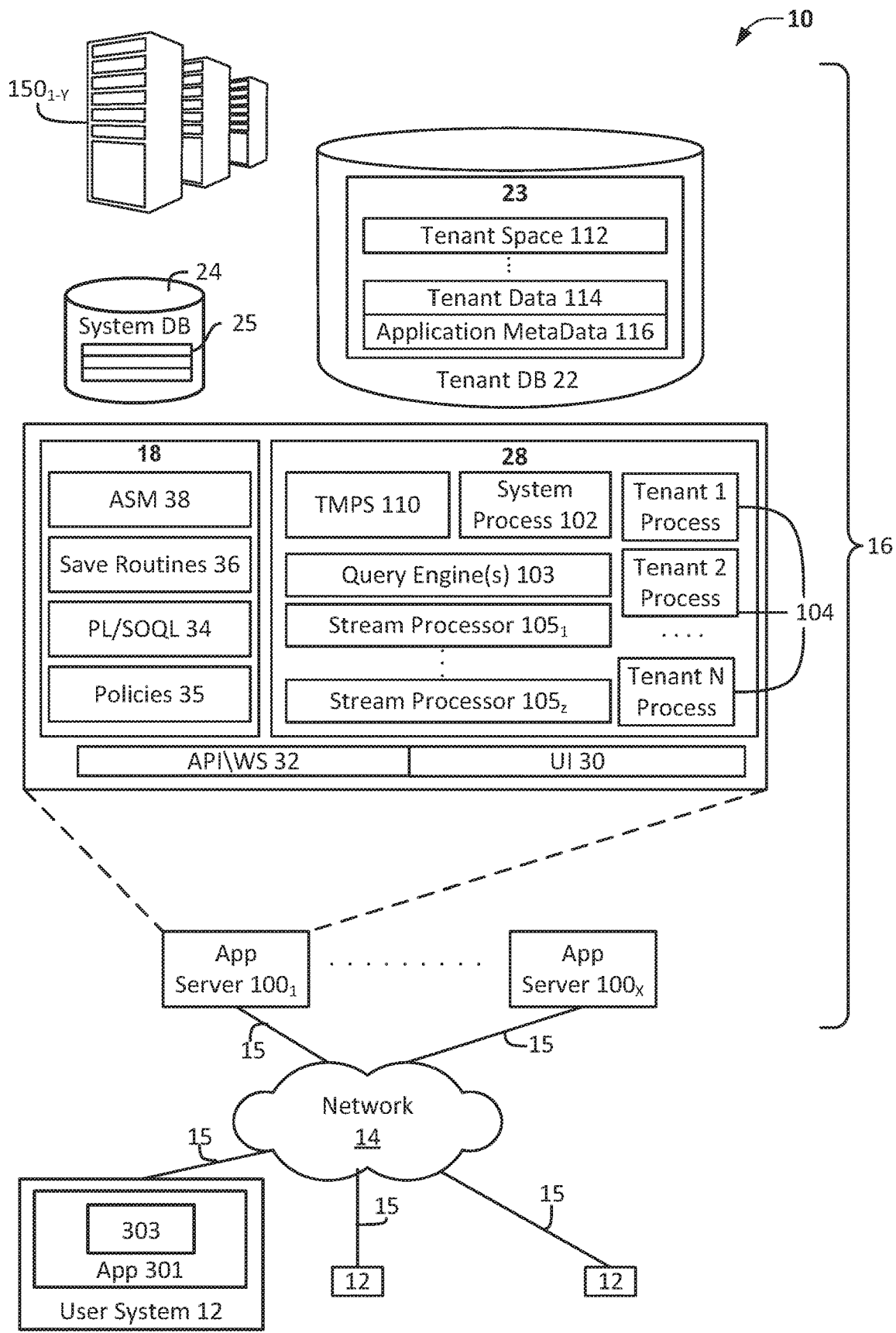
FIG. 1B shows an example implementation of elements of FIG. 1A and example interconnections between these elements according to various embodiments.

The system 16 may be a DB system and/or a cloud computing service comprising a network or other interconnection of computing systems (e.g., servers, storage devices, applications, etc., such as those discussed with regard to FIGS. 1A-1B infra) that provides access to a pool of physical and/or virtual resources. In some implementations, the system 16 is a multi-tenant DB system and/or a multi-tenant cloud computing platform. In some implementations, the system 16 provides a Communications as a Service (CaaS), Compute as a Service (CompaaS), Database as a Service (DaaS), Data Storage as a Service (DSaaS), Firewall as a Service (FaaS), Infrastructure as a Service (IaaS), Network as a Service (NaaS), Platform as a Service (PaaS), Security as a Service, Software as a Service (SaaS), and/or other like cloud services.

In some implementations, the environment 10 is an environment in which an on-demand DB service exists. An on-demand DB service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand DB services can store information from one or more tenants into tables of a common DB image to form a multi-tenant DB system (MTS). The term "multi-tenant DB system" can refer to those systems in which various elements of hardware and software of a DB system may be shared by one or more customers or tenants. For example, a given application server 100 (see e.g., FIG. 1B) may simultaneously process requests for a great number of customers, and a given DB table may store rows of data such as feed items for a potentially much greater number of customers. A DB image can include one or more DB objects. A relational DB management system (RDBMS) or the equivalent can execute storage and retrieval of information against the DB object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand DB service, users accessing the on-demand DB service via user systems 12, or third party application developers accessing the on-demand DB service via user systems 12.

In some embodiments, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a DB system related data, objects, and web page content. In some MTS implementations, data for multiple tenants may be stored in the same physical DB object in tenant DB 22. In some such implementations, tenant data is arranged in the storage medium(s) of tenant DB 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more DB objects and the execution of the applications in one or more virtual machines in the process space of the system 16. The applications of the application platform 18 may be developed with any suitable programming languages and/or development tools, such as those discussed herein. The applications may be built using a platform-specific and/or proprietary development tool and/or programming languages, such as those discussed herein.

The tenant data storage 22, the system data storage 24, and/or some other data store (not shown) include Extract-Load-Transform (ELT) data or Extract-Transform-Load (ETL) data, which may be raw data extracted from various sources and normalized (e.g., indexed, partitioned, augmented, canonicalized, etc.) for analysis and other transformations. In some embodiments, the raw data may be loaded into the tenant data storage 22, the system data storage 24, and/or some other data store (not shown) and stored as key-value pairs, which may allow the data to be stored in a mostly native form without requiring substantial normalization or formatting.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or DB, and, in some instances, a DB application (e.g., OODBMS or RDBMS) as is well known in the art. It should also be understood that "server system" and "server" are often used interchangeably herein. Similarly, the DB objects (DBOs) described herein can be implemented as part of a single DB, a distributed DB, a collection of distributed DBs, a DB with redundant online or offline backups or other redundancies, etc., and can include a distributed DB or storage network and associated processing intelligence.

The network 14 can be or include any network or combination of networks of systems or devices that communicate with one another. For example, the network 14 can be or include any one or any combination of a local area network (LAN), a wireless LAN (WLAN), wide area network (WAN), telephone network, wireless network, cellular network, point-to-point network, star network, token ring network, hub network, or other appropriate configuration including proprietary and/or enterprise networks, or combinations thereof. The network 14 can include a Transfer Control Protocol and Internet Protocol (TCP/IP) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. The network 14 may comprise one or more network elements, each of which may include one or more processors, communications systems (e.g., including network interface controllers, one or more transmitters/receivers connected to one or more antennas, etc.), and computer readable media. Examples of such network elements may include wireless APs (WAPs), a home/business server (with or without radio frequency (RF) communications circuitry), routers, switches, hubs, radio beacons, (macro or small-cell) base stations, servers (e.g., stand-alone, rack-mounted, blade, etc.), and/or any other like devices/systems. Connection to the network 14 may be via a wired or a wireless connection using one or more of the various communication protocols discussed infra. As used herein, a wired or wireless communication protocol may refer to a set of standardized rules or instructions implemented by a communication device/system to communicate with other devices, including instructions for packetizing/depacketizing data, modulating/demodulating signals, implementation of protocols stacks, and the like. Connection to the network 14 may require that the various devices and network elements execute software routines which enable, for example, the seven layers of the open systems interconnection (OSI) model of computer networking or equivalent in a wireless network.

The user systems 12 can communicate with system 16 using TCP/IP and, at a higher network level, other common Internet protocols to communicate, such as Hypertext Transfer Protocol (HTTP), File Transfer Protocol (FTP), Andrew File System (AFS), Wireless Application Protocol (WAP), Internet Protocol (IP), Internet Protocol Security (IPsec), Session Initiation Protocol (SIP) with Real-Time Transport Protocol (RTP or Secure RTP (SRTP), Internet Control Message Protocol (ICMP), User Datagram Protocol (UDP), QUIC (sometimes referred to as "Quick UDP Internet Connections"), Stream Control Transmission Protocol (SCTP), Web-based secure shell (SSH), Extensible Messaging and Presence Protocol (XMPP), WebSocket protocol, Internet Group Management Protocol (IGMP), Internet Control Message Protocol (ICMP), etc.

In an example where HTTP is used, each user system 12 can include a client application (app) 301, which may be an HTTP client commonly referred to as a "web browser" or simply a "browser" for sending and receiving HTTP signals to and from an HTTP server (also referred to as a "web server") of the system 16. In some implementations, the HTTP server may correspond to the app server 100 of FIG. 1B. In this example, each user system 12 may send and receive HTTP messages where a header of each message includes various operating parameters and the body of the such messages may include code or source code documents and/or DBOs. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the system 16. For example, any of user systems 12 can be a desktop computer, a work station, a laptop computer, a tablet computer, a handheld computing device (e.g., Personal Data Assistants (PDAs), pagers, portable media player, etc.), a mobile cellular phone (e.g., a "smartphone"), a Head-Up Display (HUD) device/system, a an Extended Reality (XR) device (e.g., Virtual Reality (VR), Augmented Reality (AR), and/or Mixed Reality (MR) device), or any other WiFi-enabled device, WAP-enabled device, or other computing device capable of interfacing directly or indirectly to the Internet or other network (e.g., network 14). The terms "user system", "computing device", "computer system", or the like may be used interchangeably herein with one another and with the term "computer."

As shown by FIG. 1A, the user system 12 includes a processor system 12A, a memory system 12B, an input system 12C, an output system 12D, and a communications system 12E. The processor system 12A can include any suitable combination of one or more processors, such as one or more central processing units (CPUs) including single-core or multi-core processors (such as those discussed herein), graphics processing units (GPUs), reduced instruction set computing (RISC) processors, Acorn RISC Machine (ARM) processors, complex instruction set computing (CISC) processors, digital signal processors (DSP), programmable logic devices (PLDs), field-programmable gate arrays (FPGAs), Application Specific Integrated Circuits (ASICs), System-on-Chips (SoCs) and/or programmable SoCs, microprocessors or controllers, or any other electronic circuitry capable of executing program code and/or software modules to perform arithmetic, logical, and/or input/output operations, or any suitable combination thereof. As examples, the processor system 12A may include Intel® Pentium® or Core™ based processor(s); AMD Zen® Core Architecture processor(s), such as Ryzen® processor(s) or Accelerated Processing Units (APUs), MxGPUs, or the like; A, S, W, and T series processor(s) from Apple® Inc.; Snapdragon™ processor(s) from Qualcomm® Technologies, Inc., Texas Instruments, Inc.® Open Multimedia Applications Platform (OMAP)™ processor(s); MIPS Warrior M-class, Warrior I-class, and Warrior P-class processor(s) provided by MIPS Technologies, Inc.; ARM Cortex-A, Cortex-R, and Cortex-M family of processor(s) as licensed from ARM Holdings, Ltd.; GeForce®, Tegra®, Titan X®, Tesla®, Shield®, and/or other like GPUs provided by Nvidia®; and/or the like.

The memory system 12B can include any suitable combination of one or more memory devices, such as volatile storage devices (e.g., random access memory (RAM), dynamic RAM (DRAM), etc.) and non-volatile memory device (e.g., read only memory (ROM), flash memory, etc.). The memory system 12B may store program code for various applications (e.g., application(s) 301 and/or other applications discussed herein) for carrying out the procedures, processes, methods, etc. of the embodiments discussed herein, as well as an operating system (OS) 333 and one or more DBs or DBOs (not shown).

In some embodiments, the user system 12 may include Trusted Compute resources that preserve data confidentiality, execution integrity and enforces data access policies. The Trusted Compute resources may be used to store cryptographic keys, digital certificates, credentials, and/or other sensitive information, and could be used to operate some aspects of an app 301. The Trusted Compute resources can be implemented using software-based cryptographic security guarantees (e.g., Zero-Knowledge Proofs), virtualization using user-level or OS-level isolation (e.g., "containerization") or virtualization (e.g., using VMs), Trusted Multi-Party-Compute (MPC) resources, or using a Trusted Execution Environment (TEE). In either embodiment, an app 301 is capable of interfacing with the Trusted Compute resources using a suitable API 32 (see e.g., FIG. 1B). Where the Trusted Compute resources is/are implemented using secure enclaves, the app 301 can also interface directly with the enclave of a secure application or other like entity, and/or interface with other enclaves.

A TEE is a hardware-based technology that executes only validated tasks, produces attested results, provides protection from malicious host software, and ensures confidentiality of shared encrypted data. The TEE operates as a protected area accessible to the processor system 12A to enable secure access to data and secure execution of instructions. In some implementations, the TEE may be a physical hardware device that is separate from other components of the user system 12 such as a secure-embedded controller, a dedicated SoC, or a tamper-resistant chipset or microcontroller with embedded processing devices and memory devices (sometimes referred to as a hardware security module (HSM) or a trusted platform module (TPM)). Examples of such embodiments include a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, Apple® Secure Enclave coprocessor; IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. In other implementations, the TEE may be realized using secure enclaves, which are isolated regions of code and/or data within the processor and/or memory/storage circuitry of the user system 12. Only code executed within a secure enclave may access data within the same secure enclave, and the secure enclave may only be accessible using the secure application (which may be implemented by an application processor or a tamper-resistant microcontroller). Various implementations of the TEE, and an accompanying secure area in the processor system 12A or the memory system 12B may be provided, for instance, through use of Intel Software Guard Extensions (SGX), ARM® TrustZone® hardware security extensions, Keystone Enclaves provided by Oasis Labs™, and/or the like. Other aspects of security hardening, hardware roots-of-trust, and trusted or protected operations may be implemented in the user system 12 through the TEE and the processor system 12A.

Referring back to FIG. 1A, Each user system 12 typically includes an operating system (OS) 333 to manage computer hardware and software resources, and provide common services for various apps 301. The OS 333 includes one or more drivers and/or APIs that provide an interface to hardware devices thereby enabling the OS 333 and applications to access hardware functions. The OS 333 includes middleware that connects two or more separate applications or connects apps 301 with underlying hardware components beyond those available from the drivers/APIs of the OS 333. The OS 333 may be a general purpose OS or a platform-specific OS specifically written for and tailored to the user system 12.

The input system 12C can include any suitable combination of input devices, such as touchscreen interfaces, touchpad interfaces, keyboards, mice, trackballs, scanners, cameras, a pen or stylus or the like, or interfaces to networks. The input devices of input system 12C may be used for interacting with a GUI provided by the browser/application container on a display of output system 12D (e.g., a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. The output system 12D can include any suitable combination of output devices, such as one or more display devices, printers, or interfaces to networks. The output system 12D is used to display visual representations and/or GUIs based on various user interactions. In an example, the user systems 12 may operate the app 301 to request and obtain data from system 16, and render graphical user interfaces (GUIs) in the app 301. These GUIs may correspond with UI 30 shown and described with respect to FIG. 1B and/or web app 303 shown and described with respect to FIG. 3. In some implementations, the GUIs/web apps 303 may include a data analytics GUI, such as Salesforce® Wave™ dashboard, Tableau® Desktop®, Salesforce® Lightning® dashboard, and the like, which may provide visual representations of data (also referred to as visual representations) residing in an enterprise cloud or in an on-demand services environment (e.g., a tenant space within system 16). As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The communications system 12E may include circuitry for communicating with a wireless network or wired network. Communications system 12E may be used to establish a link 15 (also referred to as "channel 15," 'networking layer tunnel 15," and the like) through which the user system 12 may communicate with the system 16. Communications system 12E may include one or more processors (e.g., baseband processors, network interface controllers, etc.) that are dedicated to a particular wireless communication protocol (e.g., WiFi and/or IEEE 802.11 protocols), a cellular communication protocol (e.g., Long Term Evolution (LTE) and the like), a wireless personal area network (WPAN) protocol (e.g., IEEE 802.15.4-802.15.5 protocols, Bluetooth or Bluetooth low energy (BLE), etc.), and/or a wired communication protocol (e.g., Ethernet, Fiber Distributed Data Interface (FDDI), Point-to-Point (PPP), etc.). The communications system 12E may also include hardware devices that enable communication with wireless/wired networks and/or other user systems 12 using modulated electromagnetic radiation through a solid or non-solid medium. Such hardware devices may include switches; filters; amplifiers; antenna elements; wires, ports/receptacles/jacks/sockets, and plugs; and the like to facilitate the communications over the air or through a wire by generating or otherwise producing radio waves to transmit data to one or more other devices, and converting received signals into usable information, such as digital data, which may be provided to one or more other components of user system 12. To communicate (e.g., transmit/receive) with the system 16, the user system 12 using the communications system 12E may establish link 15 with network interface 20 of the system 16.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and DB information accessible by a lower permission level user, but may not have access to certain applications, DB information, and data accessible by a user at a higher permission level. Thus, different users generally will have different capabilities with regard to accessing and modifying application and DB information, depending on the users' respective security or permission levels (also referred to as "authorizations").

According to some implementations, each user system 12 and some or all of its components are operator-configurable using applications, such as a browser, including computer code executed using one or more central processing units (CPUs) and/or other like computer processing devices (e.g., processor system 12B). Similarly, the system 16 (and additional instances of an MTS, where more than one is present) and all of its components can be operator-configurable using application(s) including computer code to run using the processor system 17, which may include one or more CPUs/processors. Examples of the processors/CPUs of processor system 17 may include one or multiple Intel Pentium® or Xeon® processors, Advanced Micro Devices (AMD) Zen® Core Architecture processor(s), such as Ryzen® or Epyc® processor(s), Accelerated Processing Units (APUs), MxGPUs, or the like; ARM-based processor(s) licensed from ARM Holdings, Ltd. such as the ARM Cortex-A family of processors and the ThunderX2® provided by Cavium™, Inc.; Centriq™ processor(s) from Qualcomm® Technologies, Inc.; Power Architecture processor(s) provided by the OpenPOWER® Foundation and/or IBM®; GeForce®, Tegra®, Titan X®, Tesla®, Shield®, and/or other like GPUs provided by Nvidia®; a MIPS-based design from MIPS Technologies, Inc. such as MIPS Warrior P-class processors; and/or the like, or the like.

The system 16 includes tangible computer-readable media having non-transitory instructions stored thereon/in that are executable by or used to program a server (e.g., the app servers 100 or other servers discussed herein) or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a server or other computing system such as, for example, C, C++, markup languages (e.g., HTML, XML, variants thereof, and/or the like), Java™ (Java™ is a trademark of Sun Microsystems, Inc.), scripting languages (e.g., ECMAScript such as JavaScript, JScript, ActionScript, etc., Active Script or ActiveX scripting such as Active Server Pages, VBScript, etc., and/or any other scripting language), and many other programming languages as are well known may be used.

The CP 50 includes one or more physical and/or virtualized systems for providing content and/or functionality (i.e., services) to one or more clients (e.g., user system 12) over a network (e.g., network 14). The physical and/or virtualized systems include one or more logically or physically connected servers and/or data storage devices distributed locally or across one or more geographic locations. Generally, the CP 50 is configured to use IP/network resources to provide web pages, forms, applications, data, services, and/or media content to different user system 12. As examples, the CP 50 may provide search engine services; social networking and/or microblogging services; content (media) streaming services; e-commerce services; blockchain services; communication services such as Voice-over-Internet Protocol (VoIP) sessions, text messaging, group communication sessions, and the like; immersive gaming experiences; and/or other like services. The user systems 12 that utilize services provided by CP 50 may be referred to as "subscribers" of CP 50 or the like. Although FIG. 1A shows only a single CP 50, the CP 50 may represent multiple individual CPs 50, each of which may have their own subscribing user systems 12.

CP 50 (also referred to as a "service provider platform", "tenant", "tenant organization", or the like) may be a customer or tenant of the system 16 that develops applications that interact and/or integrate with the system 16 and utilize data from an associated tenant space in tenant DB 22; these applications may be referred to as "customer apps," "CP apps," or the like. The term "customer platform" or "CP" as used herein may refer to both the platform and/or applications themselves, as well as the owners, operators, and/or developers associated with the customer platform. The CP apps may obtain data from the associated tenant space 112 (see e.g., FIG. 1B) to render/display visual representations of relevant tenant data 114 (see e.g., FIG. 1B). In some cases, the CP apps utilize tenant data 114 for interacting with user systems 12 (e.g., subscribers of the CP 50) via the system 16. To do so, the CP apps include program code or script(s) that call APIs/WS 32 (see e.g., FIG. 1B) to access tenant data 114 and/or otherwise interact with the tenant space 112.

FIG. 1B shows example implementations of elements of FIG. 1A and example interconnections between these elements according to some implementations. That is, FIG. 1B also illustrates environment 10, but FIG. 1B shows various elements of the system 16 and various interconnections between such elements are shown with more specificity according to some more specific implementations. In other implementations, the environment 10 may not have the same elements as those shown by FIG. 1B or may have other elements instead of, or in addition to, those listed.

In FIG. 1B, the network interface 20 and/or processor system 17 is/are implemented as a set of application servers 100i-100x (where X is a number). Each application server 100 (also referred to herein as an "app server", an "API server", an "HTTP application server," a "worker node", and/or the like) is configured to communicate with tenant DB 22 and the tenant data 23 therein, as well as system DB 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space (TMPS) 110. In various embodiments, the process space 28 includes one or more query processors 103 and one or more stream processors 105l to 105z (where z is a number). In some implementations, the stream processor(s) 105 is/are systems and/or applications that send or receive data streams and execute the applications or analytics logic in response to detecting events or triggers in/from the data streams. The stream processor(s) 105 process data directly as it is produced or received and detect conditions from the data streams within a relatively small time period (e.g., measured in terms of milliseconds to minutes). The stream processor(s) 105 may be implemented as software components (e.g., software engines, software agents, artificial intelligence (AI) agents, modules, objects, or other like logical units), as individual hardware elements, or a combination thereof. In an example software-based implementation, the stream processor(s) 105 may be developed using a suitable programming language, development tools/environments, etc., which are executed by one or more processors of one or more computing systems (see e.g., processor system 17 of FIG. 1A). In this example, program code of the stream processor(s) 105 may be executed by a single processor or by multiple processing devices. In an example hardware-based implementation, the stream processor(s) are implemented by respective hardware elements, such as GPUs (or floating point units within one or more GPUs), hardware accelerators (e.g., FPGAs, ASICs, DSPs, SoCs, digital signal controllers (DSCs), etc.) that are configured with appropriate logic blocks, bit stream(s), etc. to perform their respective functions, AI accelerating co-processor(s), tensor processing units (TPUs), and/or the like. In some embodiments, the stream processor(s) may be implemented using stream processor(s), which are systems and/or applications that send or receive data streams and execute the applications or analytics logic in response to detecting events or triggers from the data streams. The stream processor(s) process data directly as it is produced or received and detect conditions from the data streams within a relatively small time period (e.g., measured in terms of milliseconds to minutes). The stream processor(s) may be implemented using any stream/event processing engines or stream analytics engines such as, for example, Apache® Kafka®, Apache® Storm®, Apache® Flink®, Apache® Apex®, Apache® Spark, IBM Spade, Nvidia® CUDA™, Intel® Ct™, Ampa™ provided by Software AG®, StreamC™ from Stream Processors, Inc., and/or the like. In some implementations, the stream processor(s) 105 may implement or operate virtual machines (VMs), containers, or other suitable runtime environment(s) in which user apps, web apps, and/or CP apps may be executed. In some implementations, the query processor(s) 103 may also be stream processor(s) that are the same or similar to stream processor(s) 105.

The application platform 18 includes an application setup mechanism (ASM) 38 that supports application developers' ("app developers") creation and management of applications. Such applications and others can be saved as metadata into tenant DB 22 by save routines (SRs) 36 for execution by subscribers as one or more tenant process spaces 104 managed by tenant management process 110, for example. Invocations to such applications can be coded using Procedural Language (PL)/Salesforce® Object Query Language (SOQL) 34, which provides a programming language style interface extension to Application Programming Interface (API) 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

In some implementations, the application platform 18 also includes policies 35. The policies 35 comprise documents and/or data structures that define a set of rules that govern the behavior of the various subsystems of the app server 100.

For example, one or more of the policies 35 may dictate how to handle network traffic for specific network addresses (or address ranges), protocols, services, applications, content types, etc., based on an organization's information security (infosec) policies, regulatory and/or auditing policies, access control lists (ACLs), and the like. Additionally, the policies 35 can specify (within various levels of granularity) particular users, and user groups, that are authorized to access particular resources or types of resources, based on the org's hierarchical structure, and security and regulatory requirements. The documents or data structures of the policies 35 may include a "description," which is a collection of software modules, program code, logic blocks, parameters, rules, conditions, etc., that may be used by the app server 100 to control the operation of the app server 100 and/or access to various services. Any suitable programming languages, markup languages, schema languages, etc., may be used to define individual policies 35 and instantiate instances of those policies 35. As examples, the policies 35 may be defined using XML, JSON, markdown, Ecmarkup/Ecmarkdown, IFTTT ("If This Then That"), PADS markup language (PADS/ML), Nettle, Capirca™, and/or some other suitable data format, such as those discussed herein.

The application platform 18 may be, or may include, a development environment, programming language(s), and/or tools (collectively referred to as a "development environment", "dev-environment" and the like) that allows app developers to create/edit applications for implementing the various embodiments discussed herein. As examples, the dev-environment may be or include a software development environment (SDE), an integrated development environment (IDE), a software development kit (SDK), a software development platform (SDP), a schema builder, a modeling language application, a source code editor, build automation tools, debugger, compiler, interpreter, and/or some other like platform, framework, tools, etc. that may assist an app developer in building applications, configurations, definitions, and/or the like. In some implementations, the dev-environment may be a standalone application, or may be a web-based or cloud-based environment (e.g., a native application, a web application, or a hybrid application including GUIs that render an SDE/IDE/SDK/SDP implemented by a backend service (e.g., system 16) in a web browser or application container).

As mentioned previously, CPs 50 may be customers or tenants of the system 16 that develop CP apps that interact and/or integrate with the system 16 and utilize data from an associated tenant space in tenant DB 22. These CP apps may operate on or in the application platform 18, and may be developed using the aforementioned dev-environment. For example, CP apps may include or provide commerce apps/services (e.g., storefront and/or shopping cart apps, point-of-sale (PoS) apps/services, Warehouse Management System (WMS) and/or Enterprise Resource Planning (ERP) apps/services, etc.), digital marketing and engagement apps/services, advertisement network services data analytics apps/services, blockchain apps/services, and/or the like.

To integrate with the system 16, the CP apps include program code or script(s) that call the APIs/WS 32 to create and activate orders. The CP apps may also include program code/scripts that call APIs/WS 32 to adjust the orders as discussed herein. The CP apps may also call the APIs/WS 32 to return aggregate statistics about various orders. In some embodiments, the CP apps 50 may be the client app 301 discussed previously, or a web app that is rendered and/or executed by the client app 301 (e.g., where the CP apps 50 are web apps and the client app 301 is a browser HTTP client, or other user agent that renders the web apps, executes client-side scripts, and/or the like). In other embodiments, the CP apps 50 may be server-side (e.g., CP 50 side) applications, that interact with the user-facing client app 301.

The system 16 of FIG. 1B also includes a user interface (UI) 30 and one or more APIs 32 (also referred to as a "web service") to system 16 resident processes, which allow users or developers at user systems 12 to access the resident processes. The API(s) 32 is/are interface(s) for software components to communicate with each other. In some implementations, the API(s) 32 are source code specification(s) or a collection of libraries, routines, methods, data structures, fields, objects, classes, variables, remote calls, and the like that defines how a software element may access or interact with the underlying platform capabilities and features of the CP 50. Developers and programmers can use the API(s) 32 by importing the relevant classes and writing statements that instantiate the classes and call their methods, fields, etc. The app code, app/service templates, and/or policies 35 developed by customer platforms may be pushed or otherwise sent to the system 16 using one or more APIs 32. In these implementations, the app code, app/service templates, and/or policies 35 may be developed using a development (dev) environment, programming language(s), and/or dev-tools provided by the system 16.

The API(s) 32 may be implemented as a remote API or a web API, such as a Representational State Transfer (REST or RESTful) API, Simple Object Access Protocol (SOAP) API, salesforce.com Apex API, and/or some other like API. The API 32 may be implemented as a web service including, for example, Apache® Axi2.4 or Axi3, Apache® CXF, a JSON-Remote Procedure Call (RPC) API (e.g., Ethereum JSON-RPC API implemented by a public or enterprise Ethereum® blockchain platform), JSON-Web Service Protocol (WSP), Web Services Description Language (WSDL), XML Interface for Network Services (XINS), Web Services Conversation Language (WSCL), Web Services Flow Language (WSFL), RESTful web services, and/or the like.

In some implementations, the API(s) 32 may include one or more public APIs and one or more private APIs. The public APIs are APIs that includes one or more publically exposed endpoints that allows user systems 12 to access tenant data. These endpoints specify where resources are located and/or how particular web services can be accessed. The app(s) 301 may be used to generate and transmit a message (e.g., an HTTP message) with a user-issued query and a suitable URI/URL to access of an endpoint of the system 16. In embodiments, one or more of the APIs 32 may be an asynchronous ("async") query API, where the user-issued query includes an API call or other like instruction indicating that a user-issued query should be treated as an aysnc query (referred to as an "async query verb"). The async query verbs to invoke the async query API 32 may be defined and/or coded using PL/SOQL 34 or some other suitable programming or query language. When an async query invokes the async query API, an async query engine (e.g., a query engine 103) or async query scheduler may generate a corresponding async query job. The term "job" as used herein refers to a unit of work or execution that performs work that comprises one or more tasks. Individual jobs may have a corresponding job entity comprising a record or DB object that stores various values, statistics, metadata, etc. during the lifecycle of the job or until the job is executed, which are placed in a schedule or queue and executed from the queue, in turn. An async query job entity corresponding to an async query job is a job entity existing for the during the lifecycle of an async query, which is placed in a schedule or queue and executed by the async query engine, in turn. The async public API may be implemented as a REST or RESTful API, SOAP API, Apex API, and/or some other like API, such as those discussed herein.

Private APIs are APIs 32 that are private or internal to the system 16, which allows system applications (e.g., tenant management process 110, system process 102, query engine(s) 103, and stream processor(s) 105 to access other system applications. The private APIs 32 may be similar to the public APIs 32 except that the endpoints of the private APIs 32 are not publically available or accessible. The private APIs 32 may be made less discoverable by restricting users, devices, and/or applications from calling or otherwise using the private APIs 32. For example, use of the private APIs 32 may be restricted to machines inside a private network (or an enterprise network), a range of acceptable IP addresses, applications with IDs included in a whitelist or subscriber list, requests/calls that include a particular digital certificate or other like credentials, and/or the like. The private APIs may be implemented as a REST or RESTful API, SOAP API, Apex API, a proprietary API, and/or some other like API.

Each app server 100 is communicably coupled with tenant DB 22 and system DB 24, for example, having access to tenant data 23 and system data 25, respectively, via a different network connection 15. For example, one app server 1001 can be coupled via the network 14 (e.g., the Internet), another app server 100N can be coupled via a direct network link 15, and another app server 100N can be coupled by yet a different network connection 15. Transfer Control Protocol and Internet Protocol (TCP/IP) are examples of typical protocols that can be used for communicating between app servers 100 and the system 16. However, it will be apparent to one skilled in the art that other transport protocols can be used to optimize the system 16 depending on the network interconnections used. The app servers 100 may access the tenant data 23 and/or the system data 25 using suitable private APIs as discussed previously.

In some implementations, each app server 100 is configured to handle requests for any user associated with any organization that is a tenant of the system 16. In this regard, each app server 100 may be configured to perform various DB functions (e.g., indexing, querying, etc.) as well as formatting obtained data (e.g., ELT data, ETL data, etc.) for various user interfaces to be rendered by the user systems 12. Because it can be desirable to be able to add and remove app servers 100 from the server pool at any time and for various reasons, in some implementations there is no server affinity for a user or organization to a specific app server 100. In some such implementations, an interface system implementing a load balancing function (e.g., an F5 Big-IP load balancer) is communicably coupled between the app servers 100 and the user systems 12 to distribute requests to the app servers 100. In one implementation, the load balancer uses a least-connections algorithm to route user requests to the app servers 100. Other examples of load balancing algorithms, such as round robin and observed-response-time, also can be used. For example, in some instances, three consecutive requests from the same user could hit three different app servers 100, and three requests from different users could hit the same app server 100. In this manner, by way of example, system 16 can be a multi-tenant system in which system 16 handles storage of, and access to, different objects, data and applications across disparate users and organizations.

In one example storage use case, one tenant can be an organization (org) that employs a sales force where each salesperson uses system 16 to manage aspects of their sales. A user can maintain contact data, leads data, customer follow-up data, performance data, goals and progress data, etc., all applicable to that user's personal sales process (e.g., in tenant DB 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the app servers 100 to request and update system-level and tenant-level data from the system 16. Such requests and updates can involve sending one or more queries to tenant DB 22 or system DB 24. The system 16 (e.g., an app server 100 in the system 16) can automatically generate one or more native queries (e.g., SQL statements or SQL queries or the like) designed to access the desired information from a suitable DB. To do so, the system 16 (e.g., an app server 100 in the system 16) may include one or more query engines 103, which is/are a software engine, SDK, object(s), program code and/or software modules, or other like logical unit that takes a description of a search request (e.g., a user query), processes/evaluates the search request, executes the search request, and returns the results back to the calling party. The query engine(s) 103 may be program code that obtains a query from a suitable request message via the network interface 20 that calls a public API, translates or converts the query into a native query (if necessary), evaluates and executes the native query, and returns results of the query back to the issuing party (e.g., a user system 12). To perform these functions, the query engine(s) 103 include a parser, a query optimizer, DB manager, compiler, execution engine, and/or other like components. In some implementations, each of the illustrated DBs may generate query plans to access the requested data from that DB, for example, the system DB 24 can generate query plans to access the requested data from the system DB 24. The term "query plan" generally refers to one or more operations used to access information in a DB system. Additionally, the query engine(s) 103 may control or enforce the order in which queries and/or transactions are processed.

The query engine(s) 103 may include any suitable query engine technology or combinations thereof. As examples, the query engine(s) 103 may include direct (e.g., SQL) execution engines (e.g., Presto SQL query engine, MySQL engine, SOQL execution engine, Apache® Phoenix® engine, etc.), a key-value datastore or NoSQL DB engines (e.g., DynamoDB® provided by Amazon.com®, MongoDB query framework provided by MongoDB Inc.®, Apache® Cassandra, Redis™ provided by Redis Labs®, etc.), MapReduce query engines (e.g., Apache® Hive™, Apache® Impala™ Apache® HAWQ™, IBM® Db2 Big SQL®, etc. for Apache® Hadoop® DB systems, etc.), relational DB (or "NewSQL") engines (e.g., InnoDB™ or MySQL Cluster™ developed by Oracle®, MyRocks™ developed by Facebook.com®, FaunaDB provided by Fauna Inc.), PostgreSQL DB engines (e.g., MicroKernel DB Engine and Relational DB Engine provided by Pervasive Software®), graph processing engines (e.g., GraphX of an Apache® Spark® engine, an Apache® Tez engine, Neo4J provided by Neo4j, Inc.™, etc.), pull (iteration pattern) query engines, push (visitor pattern) query engines, transactional DB engines, extensible query execution engines, package query language (PaQL) execution engines, LegoBase query execution engines, and/or some other query engine used to query some other type of DB system (such as any processing engine or execution technology discussed herein). In some implementations, the query engine(s) 103 may include or implement an in-memory caching system and/or an in-memory caching engine (e.g., memcached, Redis, etc.) to store frequently accessed data items in a main memory of the system 16 for later retrieval without additional access to the persistent data store.

Each DB can generally be viewed as a collection of objects, such as a set of logical tables, containing data fitted into predefined or customizable categories. As used herein, a "database object", "data object", or the like may refer to any representation of information in a DB that is in the form of an object or tuple, and may include variables, data structures, functions, methods, classes, DB records, DB fields, DB entities, associations between data and DB entities (also referred to as a "relation"), and the like. A "table" is one representation of a data object, and may be used herein to simplify the conceptual description of objects and custom objects according to some implementations. It should be understood that "table" and "data(base) object" may be used interchangeably herein. Each table generally contains one or more data categories logically arranged as columns or fields in a viewable schema. Each row or element of a table can contain an instance of data for each category defined by the fields. For example, a CRM DB can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM DB applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant DB system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Each app server 100 is also communicably coupled with a backend cloud system including one or more cloud compute nodes $150_{1-Y}$ (where Y is a number; and collectively referred to as "cloud nodes 150," "cloud system 150," "cloud node 150", or the like), which may also interact with the DBs 22 and 24. The cloud system 150 provides various cloud computing services to CP 50 and/or user systems 12 such as providing IaaS, PaaS, etc., for CPs 50 to operate their distributed applications and services. In various embodiments, the cloud computing services may include the blockchain services discussed herein. For example, one or more CPs 50 may provide tokenization services (see e.g., token services 206 of FIG. 2) using the infrastructure and/or platforms provided by the cloud system 150. In another example, the cloud system 150 may provide token registry services (see e.g., asset token registry service 210 of FIG. 2) according to the embodiments discussed herein, such as those disused with respect to FIGS. 2-7.

The cloud compute nodes 150 may comprise one or more pools of servers, associated data storage devices, and/or other like computer devices dedicated to running/executing order management/processing and/or scheduling/queueing processes, procedures, etc. These servers may include the same or similar processor systems, memory systems, network interface, and other like components as the app servers 100 or other computer systems discussed herein. In some implementations, the servers may be or act as virtualization infrastructure for the cloud system 150. The virtualization infrastructure may comprise various hardware and software components and/or resources that are used to execute virtual or reconfigurable implementations of the cloud system 150, as well as individual components and/or subsystems. The cloud computing services provided by the cloud system 150 may be provided/implemented using virtualization and/or user-level isolation. Virtualization may refer to the abstraction of one or more isolated VMs, which are virtual versions of computer hardware platforms, storage devices, and/or network resource(s) that are operated by a virtual machine monitor (VMM) and/or hypervisor on shared computing resources. Each VM may operate one or more applications to perform various functions and/or provide various services to individual tenants and/or users. User-level isolation (also known as "containerization" or "operating system virtualization") may refer to the abstraction of multiple isolated tenant or user-space instances that may operate their own applications or services, run on a single host, and access a same OS kernel. Each tenant or user-space instance are virtualized and software-defined environments in which software applications can run in isolation of other software running on a physical host machine. The isolated user-space instances may be implemented using any suitable OS-level virtualization technology such as Docker® containers, Kubernetes® containers, Solaris® containers and/or zones, OpenVZ® virtual private servers, DragonFly BSD® virtual kernels and/or jails, chroot jails, sandboxes, and/or the like.

II. Scripting Language Aspects

Scripting languages are programming languages that are used to manipulate, customize, and automate the facilities of a computing system, and expose the functionality of the computing system to program control through a user interface. The computing system is said to provide a host environment of objects and facilities, which completes the capabilities of the scripting language. One such scripting language is ECMAScript standardized by Ecma International in ECMA-262 and ISO/IEC 16262 (see e.g., Ecma International, "ECMAScript® 2020 Language Specification", EMCA-262, 11$^{th}$ edition (June 2020) (hereinafter "[ECMA-262]"). ECMAScript (ES) is an object-oriented programming language for performing computations and manipulating computational objects within a host environment. Example implementations of ES include JavaScript® (JS), Jscript, and ActionScript. Creating robust scripting language code ("scripts") becomes increasingly important as web applications become more sophisticated. The dynamic nature of ES code at runtime presents various challenges for developers.

ES was originally designed to be used as a web scripting language, which provides a mechanism to enliven web pages in browsers and to perform server computation as part of a client-server architecture. However, ES has become widely used as a general-purpose programming language, and is now used to provide core scripting capabilities for a variety of host environments.

For use as a web scripting language, an app 301 (e.g., web browser or other client app) provides an ES host environment for client-side computation including, for instance, objects that represent windows, menus, pop-ups, dialog boxes, text areas, anchors, frames, history, cookies, and input/output. Further, the host environment provides a means to attach scripting code to events such as change of focus, page and image loading, unloading, error and abort, selection, form submission, mouse actions, and the like. Scripting code appears within the HTML and the displayed page is a combination of user interface elements (e.g., graphical control elements) and fixed and computed text and images. The scripting code is reactive to user interaction, and there is no need for a main program. Additionally, a web server provides a different host environment for server-side computation including objects representing requests, clients, and files. The web server also provides mechanisms to lock and share data. By using browser-side and server-side scripting together, it is possible to distribute computation between the client and server while providing a customized user interface for a web application. Each browser and server that supports ES supplies its own host environment, completing the ES execution environment.

ES is object-based language where host facilities are provided by objects, and an ES program is a cluster of communicating objects. As used herein, an "object" may refer to an information object, a variable, a data structure, function, method, and/or some value in memory referenced by an identifier. In ES, an "object" is a collection of zero or more properties each with zero or more attributes.

A property is a part of an object that associates a key (e.g., a String value or a Symbol value) and a value. An object can be thought of as an associative array (a.k.a., map, dictionary, hash, lookup table). The keys in this array are the names of the object's properties. Properties are containers that hold other objects, primitive values, or functions. Depending upon the form of the property the value may be represented either directly as a data value (a primitive value, an object, or a function object) or indirectly by a pair of accessor functions. An "own property" is a property that is directly contained by its object. An "inherited property" is a property of an object that is not an own property, but is a property (either own or inherited) of the object's prototype. An attribute is an internal value that defines some characteristic of a property, and determines (or defines) how each property can be used. For example, when a writable attribute for a property is set to false, any attempt by executed ES code to assign a different value to the property fails.

Property accessors provide access to an object's properties by using the dot notation (e.g., object.property) or the bracket notation (e.g., object ['property']). A getter is a function/method that binds an object property to a function that will be called when that property is looked up. Getters may be used to define a property of an object, but they do not calculate the property's value until it is accessed. A smart getter (or lazy getter) is an optimization technique where the value of the property is calculated the first time the getter is called, and is then cached so subsequent accesses return the cached value without recalculating the value. Here, "lazy" or "lazily" refers to the practice of delaying load or initialization of resources or objects until they're actually needed to improve performance and save system resources. A setter is a function/method that binds an object property to a function to be called when there is an attempt to set that property. Setters can be used to execute a function whenever a specified property is attempted to be changed.

A primitive value is a member of one of the following built-in types: Undefined, Null, Boolean, Number, BigInt, String, and Symbol. An object is a member of the built-in type Object.

ES defines a collection of built-in objects that round out the definition of ES entities. A "built-in object" is an object specified and supplied by an ES implementation. These built-in objects include global objects; objects that are fundamental to the runtime semantics of the language including Object, Function, Boolean, Symbol, and various Error objects; objects that represent and manipulate numeric values including Math, Number, and Date; text processing objects String and RegExp; objects that are indexed collections of values including Array and nine different kinds of Typed Arrays whose elements all have a specific numeric data representation; keyed collections including Map and Set objects; objects supporting structured data including JSON object, ArrayBuffer, SharedArrayBuffer, and DataView; objects supporting control abstractions including generator functions and Promise objects; and reflection objects including Proxy and Reflect objects. The proxy object intercepts and can redefine fundamental operations for another object. A proxy is created with two parameters: a target (the original object to be proxied), and a handler (an object that defines operations to be intercepted and how to redefine intercepted operations).

ES also defines a set of built-in operators. ES operators include various unary operations, multiplicative operators, additive operators, bitwise shift operators, relational operators, equality operators, binary bitwise operators, binary logical operators, assignment operators, and the comma operator. Large ES programs are supported by modules which allow a program to be divided into multiple sequences of statements and declarations. Each module explicitly identifies declarations it uses that need to be provided by other modules and which of its declarations are available for use by other modules. ES syntax resembles Java syntax, and is relaxed to enable it to serve as an easy-to-use scripting language. For example, a variable is not required to have its type declared nor are types associated with properties, and defined functions are not required to have their declarations appear textually before calls to them.

Algorithms manipulate values, each of which has an associated type. A type is a set of data values. An ES language type corresponds to values that are directly manipulated by an ES programmer using the ES language. The ES language types are Undefined, Null, Boolean, String, Symbol, Number, BigInt, and Object. An ES language value is a value that is characterized by an ES language type. Types are further subclassified into ES language types and specification types. The notation "Type(x)" is used as shorthand for "the type of x" where "type" refers to the ES language and specification types defined in this clause. When the term "empty" is used as if it was naming a value, it is equivalent to saying "no value of any type".

In ES, an object may have a single prototype object. A "prototype" is an object that provides shared properties for other objects. The prototype may be the null value. An "ordinary Object" is an object that has the default behavior for the essential internal methods that must be supported by all object. An "exotic object" is an object that does not have the default behavior for one or more of the essential internal methods. Any object that is not an ordinary object is an exotic object.

ES includes syntax for class definitions, but ES objects are not class-based as is the case for objects in other languages such as C++, Smalltalk, and Java™. ES objects may be created in various ways including via a literal notation or via constructors. "Constructors" are function objects that create objects and then execute code that initializes all or part of the object by assigning initial values to their properties. Each constructor includes a prototype property that is used to implement prototype inheritance and shared properties. The value of a constructor's prototype property is a prototype object that is used to implement inheritance and shared properties for other objects. Objects are created by using constructors in new expressions. For example, new Date (2009, 11) creates a new Date object. Invoking a constructor without using new has consequences that depend on the constructor. For example, new Date ( ) produces an object whereas Date ( ) produces a string representation of the current date and time.

When a constructor creates an object, that object implicitly references the constructor's prototype property for the purpose of resolving property references. The constructor's prototype property can be referenced by the program expression constructor.prototype. Properties added to an object's prototype are shared through inheritance by all objects sharing the prototype. Alternatively, a new object may be created with an explicitly specified prototype by using the Object.create built-in function. Furthermore, a prototype may have a non-null implicit reference to its prototype, and so on, which is referred to as the prototype chain. When a reference is made to a property in an object, that reference is to the property of that name in the first object in the prototype chain that contains a property of that name. In other words, first the object mentioned directly is examined for such the referred-to property; if that object contains the named property, that is the property to which the reference refers; if that object does not contain the named property, the prototype for that object is examined next; and this process continues until the named property is detected or found.

A function is a callable object, and a function that is associated with an object via a property is referred to as a method. A function is a member of the Object type that is an instance of a standard built-in Symbol constructor. In addition to its properties, a function contains executable code and state that determine how it behaves when invoked. A function's code may or may not be written in ES. A function object is an object that supports the [[Call]] internal method. A constructor is an object that supports the [[Construct]] internal method. Every object that supports [[Construct]] must support [[Call]]; that is, every constructor must be a function object. Therefore, a constructor may also be referred to as a constructor function or constructor function object. A method is a function that is the value of a property. When a function is called as a method of an object, the object is passed to the function as its this value. In a class-based object-oriented language, in general, state is carried by instances, methods are carried by classes, and inheritance is only of structure and behavior. An "instance" refers to a concrete occurrence of an object, which may occur, for example, during execution of program code; and "instantiate" and "instantiation" refer to the creation of an instance. In ES, the state and methods are carried by objects, while structure, behavior, and state are all inherited. All objects that do not directly contain a particular property that their prototype contains share that property and its value.

Figure 2:
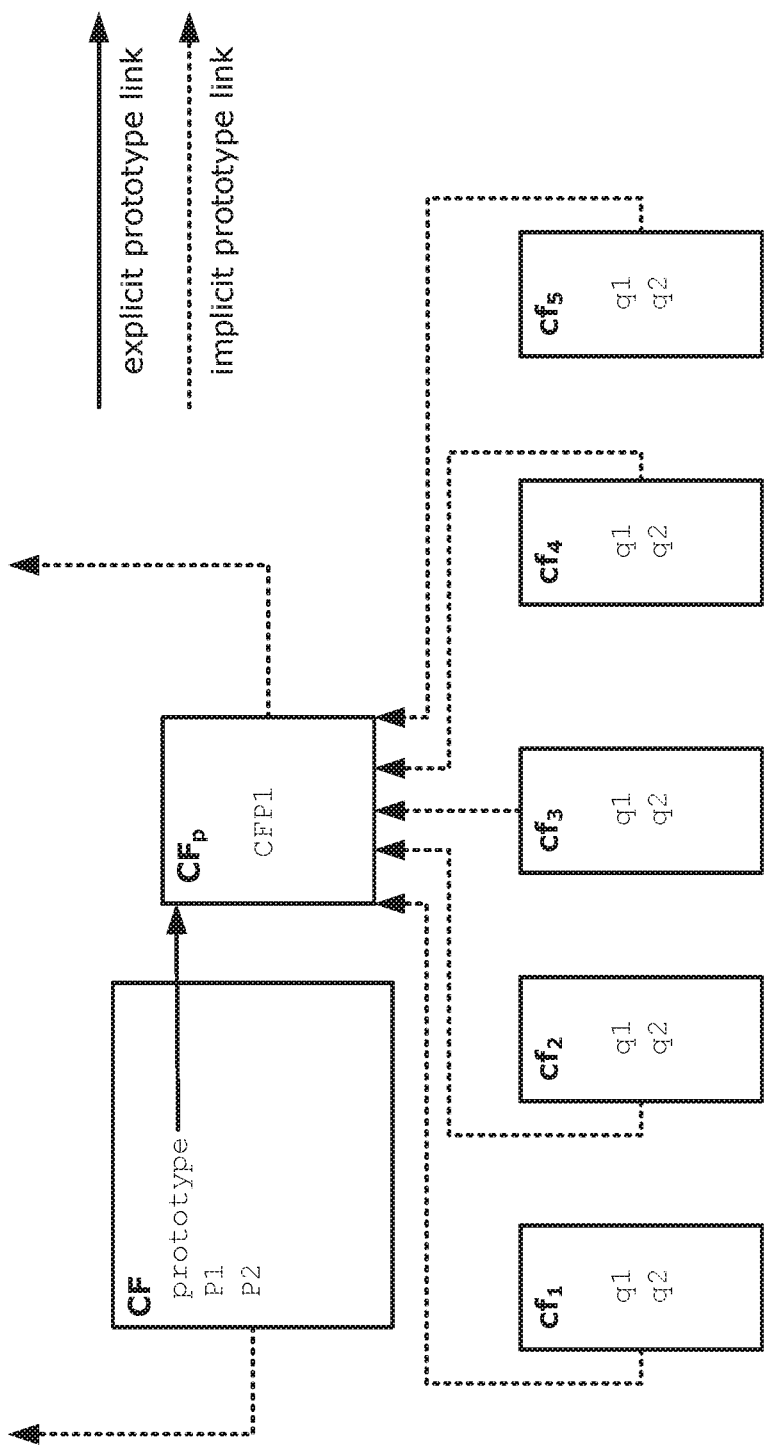
FIG. 2 shows an example of object/prototype relationships according to various embodiments.

FIG. 2 shows an example of object and prototype relationships. In FIG. 2, CF is a constructor and also an object. Five objects have been created by using new expressions including $cf_1$, $cf_2$, $cf_3$, $cf_4$, and $cf_5$. Each of these objects contains properties named q1 and q2. The dashed lines represent the implicit prototype relationship. As an example, $cf_3$'s prototype is $CF_p$. The constructor CF has two properties itself, named P1 and P2, which are not visible to $CF_p$, $cf_1$, $cf_2$, $cf_3$, $cf_4$, or $cf_5$. The property named CFP1 in $CF_p$ is shared by $cf_1$, $cf_2$, $cf_3$, $cf_4$, and $cf_5$ but not by CF, which is the case for any properties found in $CF_p$'s implicit prototype chain that are not named q1, q2, or CFP1. Additionally, there is no implicit prototype link between CF and $CF_p$. Constructors are not required to name or assign values to all or any of the constructed object's properties. Properties can be added to objects dynamically by assigning values to the objects. In FIG. 2, a new shared property for $cf_1$, $cf_2$, $cf_3$, $cf_4$, and $cf_5$ could be added by assigning a new value to the property in $CF_p$. Although ES objects are not inherently class-based, it is often convenient to define class-like abstractions based upon a common pattern of constructor functions, prototype objects, and methods. The ES built-in objects themselves follow such a class-like pattern, and ES includes syntactic class definitions that permit programmers to concisely define objects that conform to the same class-like abstraction pattern used by the built-in objects.

The ES language includes a strict variant, which is referred to as strict mode. Strict mode is used to restrict usage of some available features for security purposes, to avoid error-prone features, to enhanced error checking, or for some other reason(s). Strict mode allows a program or function to be placed in a "strict" operating context that prevents certain actions from being taken and throws more exceptions. The statement 'use strict' instructs the client (e.g., browser, app container, etc.) to use strict mode, which is a reduced and safer feature set of JS.

Strict mode excludes some specific syntactic and semantic features of the regular ES language and modifies the detailed semantics of some other features. The strict variant also specifies additional error conditions that must be reported by throwing error exceptions in situations that are not specified as errors by the non-strict form of the language. Strict mode selection and use of the strict mode syntax and semantics is explicitly made at the level of individual ES source text units. Because strict mode is selected at the level of a syntactic source text unit, strict mode only imposes restrictions that have local effect within such a source text unit. Strict mode does not restrict or modify any aspect of the ES semantics that must operate consistently across multiple source text units. A complete ES program may include both strict mode and non-strict mode ES source text units. In this case, strict mode only applies when actually executing code that is defined within a strict mode source text unit.

Before it is evaluated, all ES code must be associated with a realm. A realm is a distinct global environment in which code/script gets executed. For example, in a browser context, there is one realm per webpage. Code can be evaluated and executed within the Realm's Environment Record and Execution Context. A realm includes its own global object containing its own intrinsics and built-ins (e.g., standard objects that are not bound to global variables, like the initial value of Object.prototype). Additionally, a realm may include primordials, global scope, and global lexical scope. Primordials are a set of objects that must exist before code starts running. Primordials may be globals provided by the ECMAScript engine 302, and their properties (e.g., Object, Array, Function, String, Date, etc.).

The global object provides variables and functions that are available anywhere in the environment. In browser contexts, the global object is a global variable called "window," which represents the window in which script is running. A global globalThis property contains the global this value, which is akin to the global object. The globalThis property provides a standard way of accessing the global this value and the global object itself across environments. In many engines (e.g., scripting engine 302) globalThis is a reference to the actual global object, but where iframe and/or other isolation services are used, globalThis may reference a proxy around the actual global object, which cannot be directly accessed.

When code uses a variable name that it does not define, the variable name is looked up in these containing global scopes. Conceptually, a realm includes a set of intrinsic objects, an ES global environment, all of the script/code that is loaded within the scope of that global environment, and other associated states and resources. A global environment is an environment that does not have an outer environment. When the global environment is a window or an iframe, this global environment may be referred to as a "document environment." A global environment record (see e.g., clause 8.1.1.4 of [ECMA-262]) is used to represent the outer most scope that is shared by all of the ES script elements that are processed in a common realm. A global Environment Record provides the bindings for built-in globals (see e.g., clause 18 of [ECMA-262]), properties of the global object, and for all top-level declarations (see e.g., clause 13.2.8 and clause 13.2.10 of [ECMA-262]) that occur within a Script.

In ES, a realm is represented as a realm record with the following fields: intrinsics, GlobalObject, GlobalEnv, TemplateMap, and HostDefined. The intrinsics field describes the intrinsic values used by code associated with the realm, and is a record whose field names are intrinsic keys and whose values are objects. The GlobalObject field includes the global object of a realm. The GlobalEnv field includes a global environment record for the realm. The HostDefined field is reserved for use by host environments that need to associate additional information with the realm record.

The TemplateMap field includes a list of records {[[Site]]: Parse Node, [[Array]]: Object}. Template objects are canonicalized separately for each realm using its realm record's [[TemplateMap]]. Each [[Site]] value is a Parse Node that is a TemplateLiteral. Parse Nodes are discussed in clause 5.1.4 of [ECMA-262]. The associated [[Array]] value is the corresponding template object that is passed to a tag function. Once the Parse Node becomes unreachable, the corresponding [[Array]] is also unreachable, and it would be unobservable if an implementation removed the pair from the [[TemplateMap]] list.

III. Component Framework Aspects

Figure 3:
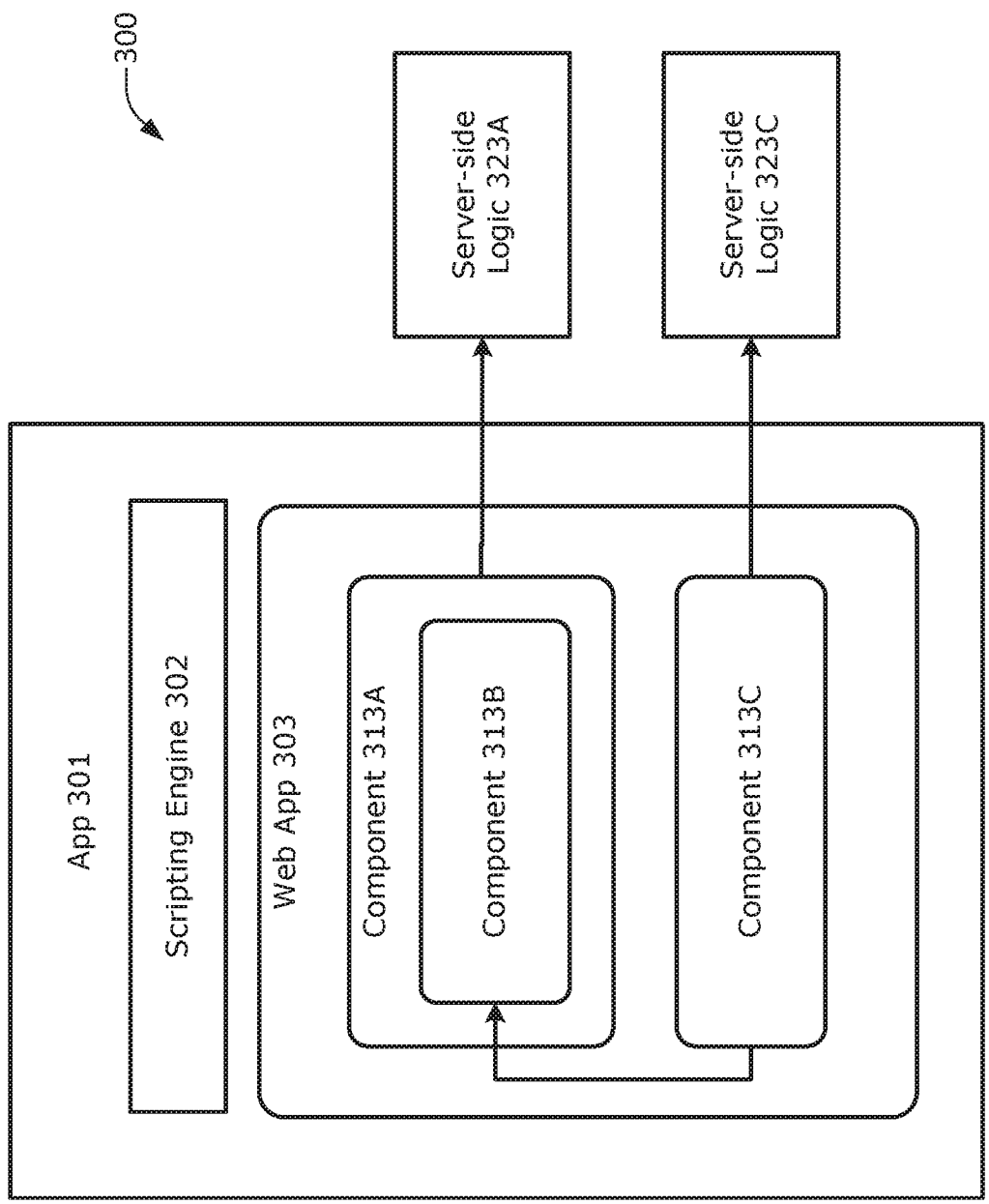
FIG. 3 shows an example component architecture according to various embodiments.

As discussed previously with respect to FIGS. 1A and 1B, the user system 12 includes one or more application(s) 301 (also referred to as "app 301" or "apps 301"). The app(s) 301 is/are a software application designed to run on the user system 12 and may be used to access data stored by the system 16. Each user system 12 may operate an app 301 designed to interact with applications of the application platform 18 allowing a user (e.g., a subscriber of on-demand services provided by the system 16) of the user system 12 to access, process and view information, pages, interfaces (e.g., UI 30 in FIG. 1B), and apps available to it from the system 16 over the network 14. The app(s) 301 may utilize a suitable querying language to query and store information in an associated tenant space, such as, for example, the various query languages discussed herein or the like. In some cases, an owner/operator of system 16 may have pre-built the apps 301 for use by clients, customers, and/or agents of tenant orgs to access respective tenant spaces and/or enterprise social networks of that org. In some cases, developers associated with a tenant org (e.g., CP 50) or a third party developer may build custom app(s) 301 for interacting with the tenant data. In either case, the apps 301 may be developed using any suitable programming language and/or development tools such as any of those discussed herein. In some implementations, the apps 301 may be developed using platform-specific development tools and/or programming languages such as those discussed herein. In some implementations, the apps 301 may be platform-specific, or developed to operate on a particular type of user system 12 or a particular (hardware and/or software) configuration of a user system 12 (e.g., when the user system 12 is a mobile device such as a smartphone, tablet computer, wearable device, etc.). The term "platform-specific" may refer to the platform implemented by the user system 12, the platform implemented by the system 16, and/or a platform of a third party system/platform. Web apps or webpages may run inside the app(s) 301, and these web apps or webpages may be built or formed from one or more components 313, as is shown by FIG. 3. For purposes of the present disclosure, the terms "webpage," "website," and "web app," may be used interchangeably, even though these terms may refer to different concepts.

FIG. 3 shows an example component architecture 300 according to various embodiments. The app 301 may represent a client or native app. The native apps run directly on the user system 12 in a same or similar manner that user apps runs directly on a desktop computer. The client/native app 301 may be a "user agent," which is an application that acts on behalf of a user, such as a web browsing app (or simply "browser") that retrieves, renders and facilitates end user interaction with web content or web apps, such as a web browser based on the WebKit platform, Microsoft's Internet Explorer browser, Apple's Safari, Google's Chrome, Opera's browser, or Mozilla's Firefox browser, and/or the like. In another example, the user agent may be an email reader/client that downloads and displays the user's emails and allows the user to create emails to send to other users.

The app 301 includes a scripting engine 302, which is a program that executes source code written in a corresponding standard. For example, when scripting engine 302 is implemented as an ES engine, the scripting engine 302 executes source code written in a version of an ES language such as JS or the like. The script engine 302 may include an interpreter and/or just-in-time compiler (or variations thereof) to execute the source code documents. The actual semantics of objects in ES are specified via algorithms called internal methods. Each object in an ES engine is associated with a set of internal methods that defines its runtime behavior. These internal methods are implementation specific.

A web app 303 (or a client-side portion of the web app 303) runs inside the app 301. The web app 303 is an application that runs on a server (e.g., app server 100) rather than being stored locally on user system 12. The web app 303 is accessed by the user system 12 through app 301 using an active connection 15 (see e.g., FIGS. 1A and 1B). Web apps 303 that run inside a native app 301 (or embed webpages 303 in a native app 301) may be referred to as "hybrid apps." The web app 303 may be developed as a Progressive Web App (PWA), which are web apps that load like webpages but offer user functionality such as working offline and device hardware access traditionally available only to native apps 301.

The web app 303 that is loaded by an app 301 may be represented by an information object. An "information object," as used herein, refers to a collection of structured data and/or any representation of information, and may include, for example electronic documents (or "documents"), database objects, data structures, files, audio data, video data, raw data, archive files, application packages, and/or any other like representation of information. The terms "electronic document" or "document," may refer to a data structure, computer file, or resource used to record data, and includes various file types and/or data formats such as word processing documents, spreadsheets, slide presentations, multimedia items, webpage and/or source code documents, and/or the like. As examples, the information objects may include markup and/or source code documents such as HTML, XML, JSON, markdown, Ecmarkup/Ecmarkdown, Apex®, CSS, JSP, MessagePack™, Apache® Thrift™, ASN.1, Google® Protocol Buffers (protobuf), or some other document(s) such as those discussed herein.

An information object may have both a logical and a physical structure. Physically, an information object comprises one or more units called entities. An entity is a unit of storage that contains content and is identified by a name. An entity may refer to other entities to cause their inclusion in the information object. An information object begins in a document entity, which is also referred to as a root element (or "root"). Logically, an information object comprises one or more declarations, elements, comments, character references, and processing instructions, all of which are indicated in the information object (e.g., using markup).

The term "data item" as used herein refers to an atomic state of a particular object with at least one specific property at a certain point in time. Such an object is usually identified by an object name or object identifier, and properties of such an object are usually defined as database objects (e.g., fields, records, etc.), object instances, or data elements (e.g., markup language elements/tags, etc.). Additionally or alternatively, the term "data item" as used herein may refer to data elements and/or content items, although these terms may refer to difference concepts. The term "data element" or "element" as used herein refers to a unit that is indivisible at a given level of abstraction and has a clearly defined boundary. A data element is a logical component of an information object (e.g., electronic document) that may begin with a start tag (e.g., "<element>") and end with a matching end tag (e.g., "</element>"), or only has an empty element tag (e.g., "<element/>"). Any characters between the start tag and end tag, if any, are the element's content (referred to herein as "content items" or the like).

The content of an entity may include one or more content items, each of which has an associated datatype representation. A content item may include, for example, attribute values, character values, URIs, qualified names (qnames), parameters, and the like. A qname is a fully qualified name of an element, attribute, or identifier in an information object. A qname associates a URI of a namespace with a local name of an element, attribute, or identifier in that namespace. To make this association, the qname assigns a prefix to the local name that corresponds to its namespace. The qname comprises a URI of the namespace, the prefix, and the local name. Namespaces are used to provide uniquely named elements and attributes in information objects. Content items may include text content (e.g., "<element> content item</element>"), attributes (e.g., "<element attribute="attributeValue">"), and other elements referred to as "child elements" (e.g., "<element1><element2> content item</element2></element1>"). An "attribute" may refer to a markup construct including a name-value pair that exists within a start tag or empty element tag. Attributes contain data related to its element and/or control the element's behavior.

When an information object (e.g., source code for web app 303) is loaded, the client app 301 (or user agent) creates a Document Object Model (DOM) of the information object. A DOM is a platform-neutral model and/or an object-oriented representation of an information object and its content. The DOM defines elements as objects, the properties of the elements, the methods to access the elements, and the events for the elements. The DOM is arranged into a hierarchical data structure. In this context, a hierarchical data structure may be any organization or collection of data elements, the relationships among the data elements, and/or the functions or operations that can be applied to the data elements. In this example, the hierarchical data structure of a DOM is a node tree data structure (or "tree") comprising a plurality of nodes, where every object within an information object is represented by a corresponding node in the tree. All properties, methods, and events available for manipulating and creating the document are organized into objects. For example, an object in an HTML document can be an element node but also a text node or attribute node. An object in a tree has a parent node and may have zero or more children nodes. A parent node is either null or another object, and children nodes are an order set of objects. An object in a tree whose parent is null is referred to as the "root node" or "root." An object A whose parent is object B is a child of B. An objectA is called a descendant of an object B, if A is a child of B or A is a child of object C that is a descendant of B. The DOM also provides an interface that allows programs and scripts to dynamically access and update the content, structure, and style of a document. Various other aspects of DOMs is discussed by the Web Hypertext Application Technology Working Group (WHATWG), DOM Living Standard, (29 Jun. 2020), available at: https:// dom.spec.whatwg.org/ (hereinafter "[DOM]"). In an example, a browser 301 may transform an HTML document into a DOM by parsing the HTML (static strings of text) into a set of objects, arranging the set of objects into hierarchical tree structure. The browser-produced objects/nodes contain properties and methods that can be manipulated by scripts or other programs. Although various example embodiments discussed herein may refer to tree data structures, the embodiments herein may be applicable to other types of data structures such as graphs, finite state machines, and the like.

[DOM] also defines event objects (or "events"), which allows for signaling that something has occurred. In particular, DOM events are actions that occur as result of state change of one or more DOM elements/objects and/or as a result of a user action. Client-side scripting languages, such as those discussed herein, can be used to register various event handlers or listeners on various elements inside a DOM.

Events are normally used in combination with functions, and the function will not be executed before the event occurs. Example DOM events may include click (e.g., when a mouse clicks on an element or when a tap on an element for touchscreen devices), mouseover (e.g., when the mouse cursor comes over an element), mouseout (e.g., when the mouse cursor leaves an element), mousedown (e.g., when the mouse button is pressed over an element), mouseup (e.g., when the mouse button is released over an element), mousemove (e.g., when the mouse is moved, DOMContentLoaded (e.g., when the HTML or other document is loaded and processed, and DOM is fully built), transitionend (e.g., when a CSS-animation finishes), keydown (e.g., when a keyboard key is pressed), keyup (e.g., when a keyboard key is released), touchstart (e.g., when a touch point is placed on the touch surface), touchmove (e.g., when a touch point is moved along the touch surface), touchend (e.g., when a touch point is removed from the touch surface), touchcancel (e.g., when a touch point has been disrupted in an implementation-specific manner, for example, when too many touch points are created), submit (e.g., when a user submits a form), focus (e.g., when a user focuses on an element, such as <input>), and/or the like. Other custom defined events could be used in some embodiments.

A handler can be assigned to an event to allow a function to react to the event. Handlers allow ES/JS code to be executed in response to different user interactions. A handler can be set in HTML with an attribute named on {event}, where the [event] is the event to be monitored. For example the oncLick attribute can be used to create a click handler to monitor for a click event, and the like. A handler can also be assigned using a DOM property (e.g., elem.onclick) or using HTML and JS (e.g., button.onclick). Scripting languages, including ES, may be used to manipulate the DOM. The DOM provides a structured, hierarchical representation of an information object, and defines how the DOM can be accessed by programs and/or components so that they can change the structure, style, and content of the information object. Typically, aspects of the DOM can be accessed and modified using a suitable API (e.g., an HTML DOM API for HTML documents, or the like).

In various embodiments, the web app 303 may be a Single Page App (SPA), which is a web app that runs inside a single webpage or screen residing in the app 301 with all supporting content such as markup, style, and scripts retrieved during the initial page load. In an SPA, page content is manipulated behind the scenes using client-side scripts/ code. Building SPAs can be somewhat difficult as it usually requires expert knowledge of various technologies including, for example, HTML, CSS, JavaScript, mobile UI design patterns, security, data serialization, and service oriented architecture. The component architecture 300 abstracts implementation complexities behind a metadata layer, which allows developers to configure page/app 303 layouts, navigation, actions, and security to configure apps 301/303 for their users.

The web app 303 includes one or more components 313 (including component 313A, component 313B, and component 313C in FIG. 3). A component 313 is a small, reusable element that can combine and interrelate with other components 313 to form a larger web app 303. Components 313 are highly encapsulated, provide modular functionality, and ideally require no assumptions about the web containers or pages in which they run. Component-centric apps 303 are a popular way to provide similar user experiences across a wide variety of devices 12, with little or no extra effort for any one platform or device 12.

In the component architecture 300, the web app 303 is a special application component that acts as an outermost container, which can be launched outside the context of other apps. Components 313A and 313C are nested in the application component container of web app 303. Some components 313 may be nested inside other components 313, for example, component 313B being nested inside component 313A. In some implementations, some components 313 may access or interact with server-side logic 323 (e.g., server-side logic 323A and server-side logic 323C in FIG. 3) to perform various functions. The server-side logic 323 may reside on one or more servers (e.g., app servers 100). These components 313 can call action methods using a client-side API (e.g., corresponding to APIs 32 in FIG. 1B) that provides a service to manage data transport for server-side processing.

Components 313 are object oriented in nature, and have similar behavior to and characteristics of classes. A component 313 can exist autonomously from other components 313. Components 313 have encapsulated presentation (e.g., markup), data state (e.g., attributes), logic (e.g., ES/JS functions), and style (e.g., CSS rules). The public interface (or shape) of a component 313 is represented by the component's 313 attributes. Each attribute is declared with a data type for the value it will reference, and may be accessed from within the component's markup or encapsulated script. The attributes are expressed as tags in a component's 313 markup, and have a collection of available named attributes such as name, type, description, required and access. The access attribute determines the attribute's scope, acting as an access modifier with values such as public (or default), private, or global.

An individual component 313 is a software package, a web service, a web resource, or a module that encapsulates a set of related functions (or data). Components 313 may communicate with each other via interfaces. When a component 313 offers services to one or more other components 313, it adopts a provided interface that specifies the services that other components 313 can utilize and how the specified services can be accessed. When a component 313 needs to use another component 313 in order to function, it adopts an interface that specifies the services that it needs. In these ways, individual components 313 can use other components 313 without knowing the inner workings of the other components 313 (e.g., the implementation). These components 313 are referred to as encapsulated components 313.

Some components 313 may be GUI elements such as graphical control elements (GCEs), tabs, reports, dashboards, widgets, etc. Other examples of components 313 may include audio/video calling components, messaging components (e.g., chat, instant messaging, short message service (SMS)/multimedia messaging service (MMS) messaging, emailing, etc.), and visualization components. The visualization components may enable a user of a user system 12 to select visualization parameters (also referred to as "lens parameters" or "filters") for displaying data from one or more datasets. Some components 313 may not implement any graphical/presentation, and instead, may only provide functional logic. For example, component 313C may only be used to connect with the a particular API 32 to obtain notifications. When a notification is received, the component 313C may raise an event for other listening components 313 to process.

Furthermore, a loosely coupled messaging system may be used across components 313, enabling the collection of components 313 to function as a single application 303. This messaging system may be implemented using the aforementioned event notifications (e.g., user interface events), handlers, and listeners. When a user interface event is fired or triggered, an associated controller action function is invoked. The controller is a function that handles client-side user actions and events, as well as fetching and binding data to elements in the component's 313 view. Each component 313 may have a controller in some implementations.

Component events can also be used for this messaging system. Component events are events triggered or issued from script/code in one component 313. Component events may be triggered and handled within a single component 313, or fired from a nested component 313B and handled in its container component 313A. In this case, the event is handled by an action function in the container component's 313A controller. Component events triggered/issued by one component 313 may be handled in one or more other components 313 that are listening for the event. Any component 313 configured as a handler for the event will receive a notification when the event is triggered/issued regardless of what component 313 fired it off.

These types of events are used to facilitate custom messaging across loosely coupled components 313 within app 303. The component events may be built-in or custom built. A component event is a coded construct that can be declared in markup and explicitly fired/triggered and/or handled in ES/JS script/code. Their primary purpose is to pass messages inside a component 313 or across components 313, and they may be triggered as a result of some browser-based user interface event. An example of such a browser-based user interface event might be to cause a refresh of a display of aggregate data in a separate component 313 when a mobile card's record data is updated. In another example, a particular element may be associated with an onClick browser-based event, and the this onClick event can be bound to a specific JS function inside a component's 313 controller resource. When a user interacts with the element, the app 303/301 triggers or issues the associated onClick browser-based event. The action by the user raises the event, but the event is handled by the function, which subsequently causes the app 303 to perform an action. By communicating through an interface and an event messaging model, the components 313 can provide great efficiencies in the rapid development of applications by allowing developers to hook together modular building blocks which can also be easily reused across multiple apps.

According to W3C, Web Components Specifications, available at: https://github.com/w3c/webcomponents (2019 Jan. 3) (hereinafter "[WebComp]"), web components are a set of features that provide a standard component model for the web allowing for encapsulation and interoperability of individual HTML elements. In particular, web components are a set of web platform APIs that allow developers to create new custom, reusable, encapsulated HTML tags to use in webpages and web apps. Custom components and widgets build on the Web Component standards and work across most modern browsers. Web components can also be used with most JS libraries or frameworks that work with HTML. Web components are based on existing web standards. Features to support web components are currently being added to the HTML specification (e.g., WHATWG, HTML Living Standard, (14 Jul. 2020), available at: https://html.spec.whatwg.org/ (hereinafter "[HTML]")) and [DOM]. Currently, web components are based on four main technologies including custom elements, shadow DOM, ES modules, and HTML templates.

Custom elements extend existing elements/tags and/or define new elements/tags. The custom elements feature includes a set of JS APIs that allow developers to define custom elements and their behaviors. Because custom elements are standards based, they benefit from the Web's built-in component model. The result is more modular code that can be reused in many different contexts. Various aspects of custom elements are discussed at section 4.13 of [HTML].

The shadow DOM includes a set of APIs for attaching an encapsulated "shadow" DOM tree to an element and controlling associated functionality. The shadow DOM allows authors to separate their page into "components", subtrees of markup whose details are only relevant to the component itself, not the outside page. The shadow DOM is rendered separately from the main document DOM, which allows an element's features to be private and to be scripted and styled without collisions with other parts of the document. The shadow DOM reduces the chances of a style meant for one part of a page accidentally over-applying and making a different part of the page look wrong. Various aspects of shadow DOM are discussed in [DOM] and in W3C, Shadow DOM, Editor's Draft, available at: https://w3c.github.io/webcomponents/spec/shadow/ (16 Jun. 2020).

ES modules defines the inclusion and reuse of ES/JS documents in a standards based, modular, performant way. An ES module is a file that explicitly exports functionality that other modules can use. To share code between components, the variables or functions of an ES module can be exported using, for example, namespace/module where the forward slash character (/) separates the namespace from the module name. Various aspects of ES modules are discussed at section 8.1.5.4 of [HTML] and Lin Clark, "ES Modules: A cartoon deep-dive," Mozilla Hacks (28 Mar. 2018), available at: https://hacks.mozilla.org/2018/03/es-modules-a-cartoon-deep-dive/.

HTML templates include data elements that are not rendered/displayed, but are stored until instantiated via ES or JS). A template is valid HTML with a <template> root tag. Templates are written using standard HTML and may include directives, which are HTML attributes, such as if:true and for:each, that can be used to manipulate the DOM. Directives are special HTML attributes that add dynamic behavior to an HTML template such as, for example, binding properties in a component's template to a property in the component's ES/JS (i.e., data binding), handling user input, computing values, rendering lists, conditional rendering of HTML, rendering multiple templates, and/or the like.

The HTML templates can be reused multiple times as the basis of a custom element's structure. The template element/ tag (<template>) is used to declare fragments of HTML that can be cloned and inserted in a document by script. The slot element (<slot>) defines a slot that is typically used in a shadow tree. A slot element represents its assigned node, if any, and its contents otherwise. A name attribute in the slot element is used to assign slots to other elements. Various aspects of HTML templates are discussed at section 4.12 of [HTML].

In various embodiments, a cloud service (e.g., system 16) provides a component framework 300 (e.g., application platform 18) for CPs 50 to build custom apps 301 (e.g., web apps 303 or client/native apps 301) using one or more pre-built and/or custom components 313. These components 313 operate within the same webpage or web app 303. The components 313 may be first party components (e.g., components 313 built-in components provided by owner/operator of system 16), second party components 313 (e.g., custom components 313 built by a tenant), or a third party components 313 (e.g., custom components 313 built by an Independent Software Vendor (ISV) for one or more tenant orgs). In some implementations, the components 313 can be published for use by various other tenants, CPs 50, developers, or subscribers. In this way, the component framework recreates the app model and app store concept for components that operate within the same web app 303.

An example implementation of such a component framework 300 is the Lightning Component Framework® provided by Salesforce.com, Inc.® (also referred to as the "Lightning platform," "Lightning Web Components," "Lightning," and/or the like). Lightning is a platform as a service (PaaS) that allows developers to create add-on applications that integrate into the main application platform 18. These third-party applications are hosted on the application platform 18 infrastructure. Lightning includes Lightning components, Lightning App Builder, and Experience Builder. Lightning components are reusable building blocks that developers can use to accelerate app development and performance. Developers can combine Lightning components to create their own apps. Developers may also develop custom components that other developers can use as reusable building blocks for their own apps. Lightning App Builder empowers admins to build Lightning pages visually, without code, using off-the-shelf and custom-built Lightning components. Experience Builder allows admins to build communities visually, without code, using Lightning templates and components. Lightning components are made available in the Lightning App Builder and Experience Builder. Lightning includes Aura components that are built using the open-source Aura Framework and Lightning Web Components (LWC), which are custom HTML elements built using HTML and modem ES/JS according to [WebComp]. LWC and Aura components can coexist and interoperate on an individual page. In some implementations, individual components can be published for use by other orgs through the Salesforce AppExchange® platform. Although various embodiments are discussed herein with respect to LWC implementations, the embodiments herein may be applicable to other user interface frameworks such as jQuery, Knockout, AngularJS, and the like.

An important consideration in internet technology is security. The nature of the internet has lent itself to many vulnerabilities, exploits, and attacks. These may be attacks on the client app 301 (e.g., web browser) on the client side, or exploits based on web application code, on the server side. Cross-site scripting (XSS) is an example of a major vulnerability on the server side. A web application may inadvertently leave itself open to an XSS exploit, allowing access of JS code to someone else such as a malicious party. While the party may have no ability to change the code, it may be able to inject and execute malicious client-side scripts into the webpage.

To avoid security exploits, the component framework 300 must provide isolation between components 313. For example, isolation between components 313 should prevent untrusted components 313 from gaining access to parts of the DOM owned or controlled by other components 313. Without the right level of isolation, a vulnerability in one component 313 (or separate malicious code) can provide access to sensitive data in other components 313 and jeopardize the security of the entire system 16. The Lightning Component Framework provides two isolation mechanisms including LockerService and the Lightning Container Component.

The Lightning Container Component (lightning:container) is a convenience component that wraps an HTML inline frame element (<iframe>) and provides a simple API to communicate between the iframe container and its content. The iframe element represents a nested browsing context, which embeds a webpage into another webpage. The iframe element allows an HTML document to be embedded in another HTML document, and the embedded HTML page is loaded in (or with) a different DOM (with limited access to the parent DOM) and runs in its own context. This provides isolation and/or sandboxing capabilities in the browser and support for any third-party libraries, including non-compliant libraries. The Lightning Container Component can be used to sandbox components or apps built with libraries that do not run with LockerService. However, Lightning Container Components have a limited communication mechanism between components (postMessage).

Locker Service® provided by Salesforce.com® is a security architecture for Lightning components 313. Locker Service enhances security by isolating Lightning components 313 that belong to one namespace from components 313 in a different namespace. LockerService wraps standard objects like window, document, and element inside a secure version of these objects (e.g., SecureWindow, SecureDocument, and SecureElement) as a way to control access to APIs and regions of the DOM. When components are loaded, they are provided with the secure wrappers (e.g., secureWindow and secureDocument) in lieu of the standard objects (e.g., window and document). When a component 313 invokes a method on the document or window object, the secure wrapper can apply appropriate security restrictions. As an example, access to the DOM of a first component 313 will be granted to a second component 313 if the second component 313 is in the same namespace as the first component 313; or denied if the second component 313 is in a different namespace. Locker Service also promotes best practices by only allowing access to supported APIs and eliminating access to non-published framework internals. In addition to providing a sophisticated namespace-based access control mechanism, Locker Service also enforces JS ES5 strict mode and Content Security Policy (CSP) ensuring Cross-site scripting (XSS) free safe code.

According to various embodiments, secure membranes are used to provide component isolation. Membranes are a defensive programming pattern used to intermediate between sub-components of an application. The pattern is applicable in any memory-safe programming language, including ES, JS, and the like. Operating systems commonly employ a variety of protection mechanisms to coordinate the interaction between applications. For example, distinct address spaces may be allocated to individual processes to isolate applications from each other. Membranes achieve a similar kind of isolation between components within a single application rather than between different applications. A membrane allows a coordinator (e.g., browser, compiler, etc.) to execute some logic in between every interaction with a particular component or sub-component, which may be a third party component or contain untrusted third party code including embedded script, third-party browser extensions (e.g., plug-ins), and/or the like. Membranes can also be created to control access to a module (object) graph, observe mutations on the object graph, and distort how the module graph is viewed.

An "object graph" is a collection of objects (and proxies to objects), which relate to one another and are for direct access from a single JS scope. In the context of membranes, each unique object within an object graph has a one-to-one relationship with a proxy to that object in a completely separate object graph. The references from an object to its child properties are copied in the proxy, but refer to equivalent properties in the proxy's object graph, not the original object's graph. Here, a "membrane" is a collection of object graphs, and the rules for managing and creating proxies within them. Additionally or alternatively, a membrane is a collection of two or more object graphs, along with the rules that determine how to transform a value from one object graph to another.

A membrane is a controlled perimeter around one or more objects (or one or more components 313) and may be implemented through proxies or wrapper objects. The perimeter may start with a single root object. For example, web page code could wrap a window object in a membrane proxy, and the proxied window may be passed on to an embedded third-party script. Membrane proxies may be transparent such that, from the perspective of a client of the proxy, interactions with the membrane proxy appear indistinguishable from interacting with the wrapped object. Objects that are passed through a membrane proxy may be transitively wrapped inside another membrane proxy, which may enforce the same logic as the original object. Additionally, if a host application calls a function with an event, the membrane passes a proxy to that event instead of the event itself.

A wrapped object is a membrane proxy to a corresponding unwrapped object; an unwrapped object is a raw object. Wrapping refers to creating a proxy for an object and adding the proxy to a different object graph. Counter-wrapping happens with function arguments and "this" arguments, where the proxy to a function is invoked as a function itself. In this case, each argument is either unwrapped (e.g., if it belongs to the same object graph as the target function) or wrapped in a proxy (e.g., if it belongs to a different object graph) before the ObjectGraphHandler passes it into the function's object graph. This latter process I call "counter-wrapping", to indicate it is going from the foreign object graph back to the function's object graph. Otherwise, it is the same. The ObjectGraphHandler is a ProxyHandler implementation that forms the base for membrane proxies, and enforces the rules and correct behavior for membrane proxies.

A proxy or proxy object is used to define custom behavior for one or more operations (e.g., property lookup, assignment, enumeration, function invocation, etc.). In ES, a proxy object is an exotic object whose essential internal methods are partially implemented using ES code. An exotic object is any form of object whose property semantics differ in any way from the default semantics. Every proxy object has an internal slot called ProxyHandler. The value of ProxyHandler is an object, called the proxy's handler object, or null. Methods of a handler object may be used to augment the implementation for one or more of the proxy object's internal methods. Every proxy object also has an internal slot called ProxyTarget whose value is either an object or the null value. This object is called the proxy's target object. A target is an object that a proxy virtualizes. Proxy objects have special methods called "traps" that are invoked when a property is being read or written to; in other words, traps are methods that provide property access. Traps are invoked on each property access. A proxy's handler object is a placeholder object that contains traps for proxies.

When a handler method is called to provide the implementation of a proxy object internal method, the handler method is passed the proxy's target object as a parameter. A proxy's handler object does not necessarily have a method corresponding to every essential internal method. Invoking an internal method on the proxy results in the invocation of the corresponding internal method on the proxy's target object if the handler object does not have a method corresponding to the internal trap. The ProxyHandler and ProxyTarget internal slots of a proxy object are initialized when the object is created and typically may not be modified. Some proxy objects are created in a manner that permits them to be subsequently revoked. When a proxy is revoked, its ProxyHandler and ProxyTarget internal slots are set to null causing subsequent invocations of internal methods on that proxy object to throw a TypeError exception.

Distortions may also be applied to the wrapped object, for example, by replacing some operations with less sensitive dummy operations, or the like. Usually, a membrane's proxies parallel the properties of the objects they mirror, unless there are explicit rules defined on the proxy where they do not exactly mirror those properties. These rules are called "distortions" because they distort the image of the underlying object through the proxy. One example would be hiding properties of the underlying object.

Although various embodiments discussed herein are described with reference to Lightning components 313 as an example component framework 300, it should be understood that the various embodiments herein are also applicable to other component-based frameworks such as the W3C Web Components framework and/or the like. Additionally, although various embodiments discussed herein are described with reference to Locker Service as an example sandboxing and/or isolation service implementation, it should be understood that the various embodiments herein are also applicable to other isolation service implementations such as cross compartment wrappers provided by Mozilla® Firefox®, Google® Caja®, "Use Strict" in ES, and/or the like.

IV. Secure Membrane Embodiments

As alluded to previously, the system 16 may provide a component framework that runs ontop of the application platform 18, which allows CPs 50 to develop components for their client apps 301. The components 313 run ontop of the application platform 18, and multiple components 313 may run on/in the same web app 303. These components 313 may also come from multiple different sources and may be developed by different parties. For example, some components 313 may be first party components (e.g., built-in components provided by the system 16), second party components (e.g., custom-built by a CP 50), or third party components (e.g., custom-built by an ISV for one or more CPs 50). The components 313 can then be published for use by other customers through a component store. Essentially, this component framework 300 and component store model recreates the app store concept for components used by mobile platforms that operate within the same web app 303.

Currently, there is no way to establish a trust relationship or a security model between different components running within the same webpage or web app. As an example, an insurance company may be a client of the system 16, and may use the component framework to develop an intake component that takes various user inputs including personally identifiable information (PII) and/or other sensitive information such as a subscriber's name, home address and a zip code, Social Security number, and/or the like. In this example, the insurance company may have purchased or licensed a third party component that calculates risk per zip code that runs on the same page as the intake component. Without a security model in place, or "guardrails" between the two components, the third party component can reach into the intake component and extract all the data collected from subscribers. The third party component could provide useful functionality, or the third party component may be malicious (or use subscriber information for malicious purposes). The security measures that exist within an operating system and/or virtualization technologies cannot be reused for the component model even.

In Salesforce® Locker Service (sometimes referred to as "Locker Next" or "Locker") implementations, the existing Lighting Locker core engine relies on introducing secure DOM classes into a synthetic realm. The creation of secure classes requires tracking a large amount of metadata, which adds to the maintenance and resource consumption burdens of Lighting Locker. As browsers add new APIs, the secure classes must be updated. The DOM API is vast, and while much of the DOM API is covered, there are still gaps in this coverage. Over time, technical debt has caused the implementations of secure classes to become splintered and inconsistent, with some secure classes preserving identity continuity and others not. In addition, the synthetic realm has become an attractive target for exploits, creating an ever growing bug tail of issues to resolve. Embodiments herein can be used to simplify the Lighting Locker core implementation, reduce on-disk footprint, improve performance, increase compatibility with modern web standards and ecosystem code, and allow for a more secure real sandbox backed by the client app 301.

According to various embodiments, "secure membranes" are used to provide a security model for components inside of webpage or web app. The secure membranes are added or wrapped around respective components. The secure membranes are isolated, secure script execution environments (e.g., a "sandbox") in which scripts of individual components are executed. Inside the secure membranes, the script is executed, evaluated, and then applied to the web app if the operations of the executed script is determined to be secure operations. Continuing with the aforementioned example, when using the secure membrane embodiments, the intake component and the third party component get their own secure membrane in which to operate. The code of each component executes within its corresponding sandbox. Each component can make changes to the functionality of the component itself, but cannot access other components and make potentially malicious or negative changes to the other components.

In particular, each component 313 includes a declared or defined namespace. In one example implementation, first party components may all share the same namespace (e.g., a namespace of the system 16). Additionally or alternatively, second party components developed by a given CP 50 may share the same namespace, and third party components developed by a given ISV may share the same namespace. In embodiments, the namespace for each component is detected when the web app is loaded, and a secure membrane is created for each detected namespace. A component is executed inside the secure membrane created for its namespace. The secure membranes for each component of a web app is maintained until the web app 303 ends or is terminated (e.g., when a user navigates away from the webpage).

In some implementations, the namespace for a particular component, or set of components, may be defined or declared in a component configuration file, a manifest file, or another information object (e.g., XML, JSON, etc.) that controls how an app 303 and/or component 313 appears and ensures that apps 303 and/or components 313 are discoverable. In one example, the configuration or manifest file may describe or define, for example, an app 303 and/or component 313 type, version number, a name (or namespace) of an app 303, name (or namespace) of individual component 313 of an app 303, author of the app 303 or component 313, a list of other files or resources included in the app 303 and/or component 313 (or app or component package), a list of external script dependencies, a list of component dependencies, attributes of the app 303 and/or component 313, events of the app 303 and/or component 313, methods of the app 303 and/or component 313, icon(s), metrics to be tracked for the app 303 and/or component 313, activities, services, permissions, target pages/apps 303 where a component 313 can be added or used, required hardware and/or software features, supported form factors or devices that the component supports, among other details and/or metadata. The manifest file may have a predefined schema depending on the format used (e.g., JSON, XML, etc.) and/or specific implementation of the component framework 300. Components 313 can then be referenced within an HTML template using <namespace-component> where the hyphen character (-) separates the namespace from the component name, or within JS using <namespace/component> or <namespace/module> where the forward slash character (/) separates the namespace from the component or module name. Other syntax can be used in other embodiments.

In embodiments, a membrane is implemented to sandbox an ES/JS environment object graph. This membrane is responsible for connecting a sandboxed realm with a non-sandboxed realm. These realms are connected by remapping global references in the sandboxed realm to be proxies created in the sandboxed realm, where these proxies have target values in the non-sandboxed realm. This membrane modulates the communication between the two realms, specifically by creating proxies around objects and functions, while letting other primitives values travel safely throughout the membrane. Through the use of secure membranes, an object graph of an ES/JS environment can be secured without introducing identity discontinuity. Identity discontinuity happens when two or more realms, when in contact, mix their object graphs freely. When realms do this, they encounter an inconvenience and source of bugs we will here call identity discontinuity. For example if code from a first realm makes an array arr that it passes to code in a second realm, and the second realm tests arr instanceof Array, the answer will be false since arr inherits from the Array.prototype of the first realm, which is a different object than the Array.prototype of the second realm. Code isolation can be greatly improved when combined with a real, non-synthetic, realm. An example implementation is provided by Table III-1.

TABLE III-1 import createSecureEnvironment from 'secure-javascript-environment/browser-realm.js'
const secureGlobalThis = createSecureEnvironment( )
secureGlobalThis.eval(sourceText)

In embodiments, three values may be used to create a secure environment (secure membrane) including: rawGlobalThis (rawGlobalThis), secure globalThis (secureGlobalThis), and a distortion callback (distortionCallback). The raw globalThis is assigned the value of the global object (e.g., using rawGlobalThis=getGlobalThis( )). This could be done in by the createSecureEnvironment( ) function. The secureGlobalThis is assigned the created secure environment (e.g., the created iframe). The eval function evaluates ES/JS code represented as a string and is the main mechanism for evaluating code inside the sandbox. For a given secure realm, the property descriptors of the secureGlobalThis object are remapped to those of the rawGlobalThis object, replacing getters, setters, and values for function and object properties of secureGlobalThis with proxied counterparts. However, the original function and object values are not the targets of the proxies. Instead, in various embodiments, membrane targets are created for no-op functions or plain objects populated with snapshots of the own property descriptors and proxied prototypes of the raw values. shadow realm object graphs of membrane targets are lazily populated when their first proxy trap is triggered. An example is shown by Table III-2.

TABLE III-2

In the primary window:
    // Before the secure environment is created.
    Object.assign(document.body, { a: 1, b: 2 })
In the shadow realm:
    // The 'body' property of 'document' in the shadow realm is a proxy. On access
    // of 'document.body.a' the 'get' proxy trap is triggered populating the secure
    // object graph with a one time snapshot of the own 'document.body' properties
    // from the primary window.
    document.body.a // => 1; shadow realm object graph is { a: 1, b: 2 }
    document.body.c = 3 // shadow realm object graph is { a: 1, b: 2, c: 3 }
Back in the primary window:
    // The primary window 'document.body' is NOT augmented with the 'c' property.
    'c' in document.body // => false
    // Adding properties to the primary window 'document.body' is not reflected in
    // the shadow realm.
    document.body.d = 4
Back in the shadow realm:
    'd' in document.body // => false In the example of Table III-2, the Object.assign( ) method in the primary window copies all enumerable own properties from one or more source objects (e.g., {a: 1, b: 2}) to a target object (e.g., document.body), and returns the target object. The document.body property represents the <body> or <frameset> node of the current document, or null if no such element exists. The body property of document in the shadow realm is a proxy. The shadow realm may be a realm that corresponds to a particular shadow DOM. On access of document.body.a the 'get' proxy trap is triggered populating the secure object graph with a one time snapshot of the own document.body properties from the primary window.

Objects created in the shadow realm are viewed in the primary window through a reverse proxy. Unlike proxied primary window values, proxied shadow realm values eagerly populate their primary realm object graph. An example is shown by Table III-3.

TABLE III-3

In the shadow realm:
    const o = { x: 1, y: 2 }
    // The 'console' is that of the primary window.
    console.log(o) // logs a reverse proxied object of { x: 1, y: 2 }
    o.z = 3
    console.log(o) // logs the same proxied snapshot object of { x: 1, y: 2 }

The realm can be created in a variety of ways. In one implementation, these realms may be created using iframes, for example, by generating/creating an HTML document including iframe tags for each component referencing respective component resources. The iframe implementation relies on working around a Chrome® browser bug that can either make or break the implementation. Such implementations should ensure Chrome sides on fixing the issue in a way that keeps the workaround working and does not cut functionality. Distortions for script injection and HTML creation can also be used for this implementation.

In other implementations, a realm object may be created for each namespace, such as by using the Realms API discussed in Ecma International, "Realms API", TC39, stage 2 draft (Jul. 13, 2020), available at: https://tc39.es/proposal-realms/ (hereinafter "[RealmsAPI]").

V. Cross Namespace Communication Embodiments

Various embodiments include cross namespace communication mechanisms for isolated components provided by a component framework. As mentioned previously, component isolation services, such as secure membranes, prevent script execution across namespaces. Because secure membranes prevent script from executing across namespaces, components in different namespaces may not be able to communicate or integrate with one another. The cross namespace communication embodiments herein enable isolated components to have trusted, secure communication across namespaces.

Figure 4:
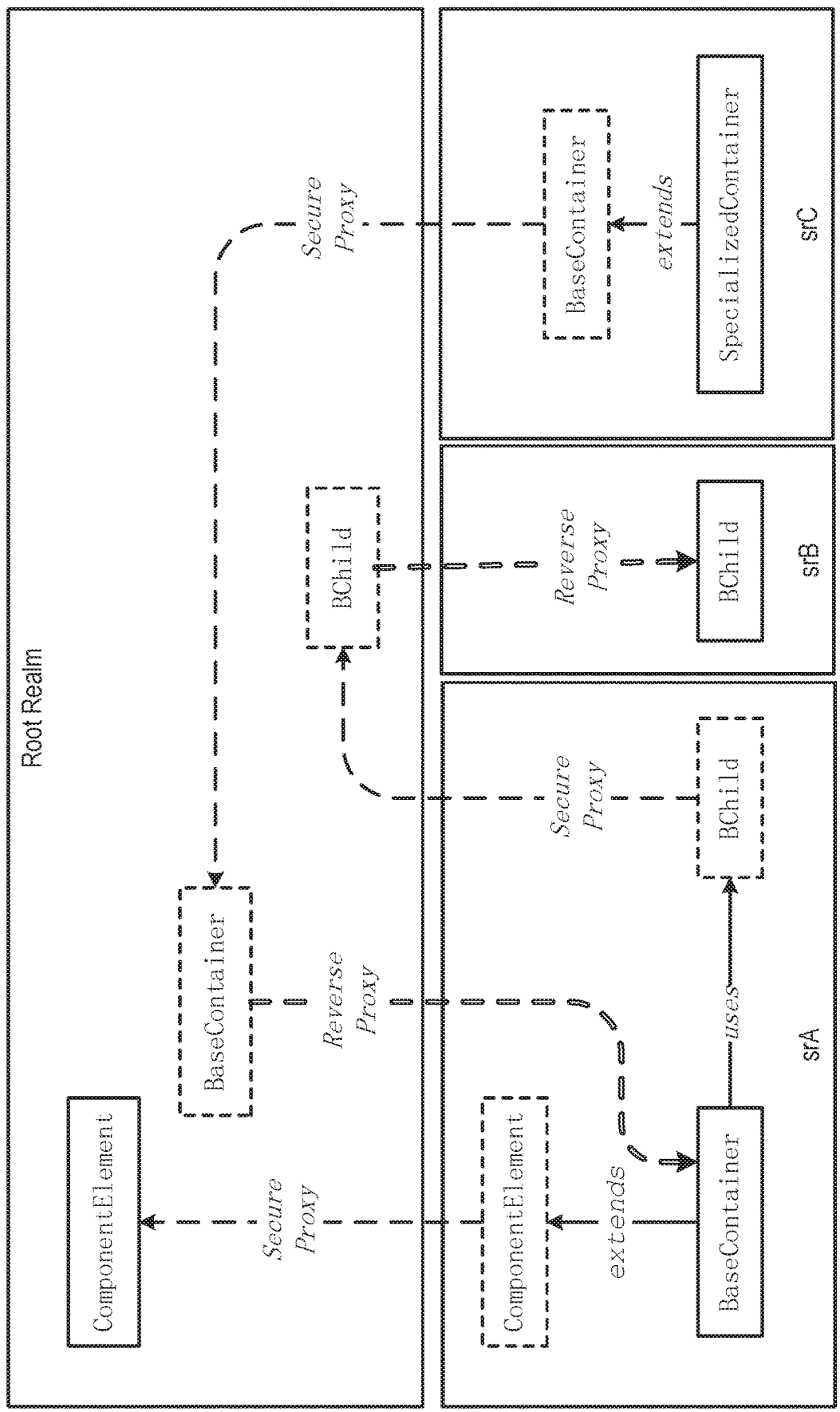
FIG. 4 shows an example of cross namespace communication according to various embodiments.

FIG. 4 shows an example of cross namespace communication according to various embodiments. In this example, there are there namespaces, including namespace A, namespace B, and namespace are all running in/on the same app 303. The namespaces A, B, and C interact with one another in two different ways including via class inheritance and via component composition.

Currently, components 313 are limited when extending elements or components from another sandboxed namespace, and the only extensions allowed are those coming from a system mode namespace (e.g., the root realm) or coming from the same namespace sandbox. Embodiments herein allow multiple components 313 to interact with one another even when each of their namespaces are isolated from one another, for example, by using a component isolation service such as Locker Service, the secure membranes embodiments discussed previously, or some other namespace/component isolation service. Reverse namespaces were developed in an attempt to solve this problem. This failed due to the complexity and the confusion introduced by the new boundaries, which are cross-cutting throughout different namespaces, making it difficult for a developer to understand why certain things will just never work (e.g., sharing cookies). The embodiments herein allow cross namespace communication without compromising the security guarantees imposed on a namespace by isolation services. For example, a developer can extend and use a component 313 from any other namespace if the component 313 is marked as global.

In the example of FIG. 4, the namespaces are part of component framework 300 that implements the secure membrane embodiments discussed previously to sandbox the secure environment object graph, which have intersections with the root realm object graph. As alluded to previously, a "secure membrane" or "membrane" is a piece of logic that provides namespace and/or component isolation as discussed herein. Additionally, a secure membrane is a piece of logic that connects the root realm with a secure realm. A realm is the environment in which code/script gets executed. The root realm is a fully (or mostly) isolated sandbox that contains intrinsics, or base objects, for the web app 303 from which everything extends. In embodiments, the root realm also acts as a secure broker that brokers all operations that can happen in the app 303. The root realm may be a system mode, such as the ES/JS realm of web app 303.

A "secure realm" refers to a sandbox, or isolated namespace instance, for example, an ES/JS realm of one sandbox corresponding to a namespace. In the example of FIG. 4, the namespaces A, B, and C are associated with respective secure realms, namely secure realm A (srA), secure realm B (srB), and secure realm C (srC). A secure realm is also associated with one or more secure environment instances. A secure environment instance is the ES/JS environment associated to/with a secure realm. Sometimes "secure realm" and "secure environment instance" are interchangeable terms. Since an app 303 can have multiple secure environment instances created by the root realm, there is a possibility that the secure realms attempt to communicate with each other. This communication cannot occur without explicit supervision of the creator of the secure realms, which is the root realm.

In some embodiments, the component isolation service is also implemented using two types of proxies: secure proxies and reverse proxies. A "secure proxy" refers to a proxy that can be seen by a secure realm to access an object provided by the root realm. A secure proxy produces an object that is only accessible from within the secure environment, where most operations (but not all) will be performed in the root realm. A "reverse proxy" refers to a proxy that can be seen by the root realm to access an object provided by a secure realm. A reverse proxy produces an object that is only accessible from the root realm, but all operations will be performed in the secure environment.

In embodiments, marshaling is used to avoid getting into an infinite loop of proxies for the same object if they are passed from one secure realm to another. Such embodiments involve preserving the identity of the original objects or reverse proxies seen by the root realm. In particular, for a namespace to communicate with another namespace, it does so through the root realm. For example, as shown by FIG. 4, srA talks to the root realm via a secure proxy, providing arguments that the root realm will see as reverse proxies, and the root realm will decide to give away those reverse proxies to srB. For srB, the arguments received from the root realm are seen as secure proxies nevertheless, because it does not know anything about srA. This means that for an object to be shared between two secure realms (or sandboxes), the object on the receiver will be a secure proxies of a reverse proxy, meaning that it should fulfill with the intersection semantics of both concepts (details infra). This means that it does not matter how many times an object reference is propagated throughout sandboxes, the maximum proxy wrapping level is going to stop at two proxies per object shared between sandboxes. In these ways, the root realm acts as a mediator, orchestrator, or secure broker for secure brokered communications.

This concept is extended beyond proxies, and is applicable to other structures, such as arrays and the like. In these embodiments, an array will never travel through the membrane. Instead, a new array will be created on the other side of the membrane. Additionally, array items will be processed individually, which means no live arrays can be used as a communication channel between the two sides of the membrane. This matches the semantics of the cross-domain postMessage.

Secure proxies are "magical objects" (or group of magical objects) with one single objective, to protect non-observed mutation on objects coming from the Root realm. In other words, any mutation on value descriptors, or_proto_ will be only seen inside the sandbox while no changes will be reflected on the original object. From the sandbox point of view, the object is changing, but only to its knowledge.

Reverse proxies are less magical objects and more predictable. Reverse proxies protect objects created by a sandbox, and are never changed by the root realm or any other sandbox, directly or indirectly. In other words, a reverse proxy is effectively frozen, cannot change anything on them. They are never coming from the root realm, they are never intrinsics or DOM APIs. This matches somehow the semantics of cross domain iframes where it is only possible to receive copies of the objects via postMessage. In this case it is not a copy; instead, it is a lightweight frozen version of the object from the other side of the fence.

Intersection semantics are objects created by a sandbox, and accessed from another namespace, in which case the object will be wrapped in two proxies, the reverse proxy first, and then a secure proxy on top of that. Since the reverse proxy is a subset of secure proxy, the observed object from the second sandbox will follow the semantics of a Reverse Proxy even though it is received as a secure proxy.

In various embodiments, cross namespace communications for specific namespaces may be defined or declared using configuration files or manifest files defined for respective apps 303 or respective components 313. The configuration/manifest file defines various details and/or metadata for an app 303 or component(s) 313 as discussed previously. According to various embodiments, a manifest for an app 303, component 313, or set of components 313 can specify namespaces that are permitted to communicate or access that app 303, component 313, or set of components 313. As an example, a manifest for a component 313 in srB can declare that cross namespace communication is permitted with srA (and components 313 therein), and may not list srC to prevent cross namespace communication with components 313 in or otherwise associated with srC. Additionally, a configuration/manifest may specify complete isolation to prevent all cross namespace communication/access from all other namespaces. Further, if a configuration/manifest does not specify anything (e.g., does not specify permitted namespaces or complete isolation), certain default secure brokered communications are considered permitted and enabled. The set of secure brokered communications may include the previously discussed distortions. In this way, a component manifests can be used to establish a trust relationship or a declarative trust model among components.

At runtime, when a component 313 in a first secure realm (e.g., srA) tries to reach in to a second secure realm (e.g., srB), if the first secure realm has no restrictions, then the default secure brokered communications are permitted. This allows the component 313 in the second secure realm to use or import a component 313 in the first secure realm, which is the cross namespace communication. Here, a copy or imported functionality is brought into the second secure realm rather than allowing the component 313 in the second secure realm to modify or interact with the component 313 in the first secure realm. In other words, a mirror object is created in the second secure realm of an original object in the first secure realm, and components (and/or users) interact with the mirror object within the confines of the second secure realm without manipulating the original object. Any attempt to modify original primitives or an original object, or any sort of operations that happen on the original objects themselves, are not permitted. However, an original object may be extended and modified as desired.

The root realm and individual namespaces may include their own components 313 and/or import components 313 from the root realm or other namespaces. For example, in FIG. 4, the Component Element is defined in the root realm. The Component Element is an intrinsic element (or base copy), which is an original DOM representation of that element. The ComponentElement can be extended and used by other components 313 in other namespaces. As an example, an <a-container> component from namespace A may be declared as shown by Table V-1.

TABLE V-1 import ComponentElement from 'rootRealm';
export default class BaseContainer extends ComponentElement { }

This component 313 uses <b-child> component from namespace B via a template as shown by Table V-2.

TABLE V-2

<template>
</template>

Additionally, a third component, <c-container> component, from namespace C is declared as shown by Table V-3.

TABLE V-3 import BaseContainer from 'a/container';
export default class SpecializedContainer extends BaseContainer { }

The components 313 in the different namespaces (e.g., srA, srB, and srC) in the example of FIG. 4 communicate with one another via the root realm. Still referring to FIG. 4, srA creates a class called BaseContainer, and the BaseContainer class extends a class definition that comes from the root realm, which is accessible in srA via a secure proxy of a ComponentElement. Additionally, srA imports a constructor for component BChild that comes from srB, and that is used via an HTML template (see e.g., Table V-2). This reference is a secure proxy of a reverse proxy of a class BChild defined in srB. Further, srC creates a class called SpecializedContainer. The SpecializedContainer class extends a class definition that comes from srA (i.e., BaseContainer) via the root realm. This reference is a secure proxy of a reverse proxy of class BaseContainer defined in srA.

In an example, the web app 303 may be a GUI form that allows a user to input and submit payment information. The BaseContainer in srA may be a component 313 that determines whether the user has been authenticated or not, and the component 313 in srC may include various input fields. The BaseContainer in srA may invoke some functionality of component Bchild in srB. In this example, component Bchild is a button with an onClick handler that will redirect the user to an authentication platform (e.g., bank, email account, etc.) for user authentication, and then redirects the user back to the web app 303 to fill out the form. The BaseContainer detects whether the user has been authenticated, prints/displays text indicating successful authentication, or prints/displays text to press the Bchild button if the user has not been authenticated. After selecting the Bchild button and is properly authenticated, the user may be redirected back to the web app 303 in order to fill out the credit card information in srC, for example. In this example, srA does not make a copy of the Bchild button. Instead, srA uses the Bchild button by invoking the original functionality of that the Bchild button. In other words, the secure functionality of the Bchild button is shared between srB and srA. In this way, importing the Bchild button from srB into srA via inheritance creates a "copy" or mirrored version of the Bchild button in srA that is no longer tied to the Bchild button in srB. This makes the Bchild button part of the GUI in srA, and the developer may change the styling and design of the Bchild button in srA (e.g., color, shape, size, text in/on the button, etc.) as well as its functionality (e.g., the button's onClick handler) as desired within srA without altering the original Bchild button in srB.

The example of FIG. 4 illustrates how any reference sharing between sandboxes is marshaled by the root realm via the secure proxy on top of a reverse proxy to reduce the possibility of attack due the very narrow intersection semantics of those two different proxies. Additionally, all the functionality is preserved due to the nature of those two proxies, they do not impose any observable difference in terms of functionality.

In some cases, poisoning is still possible via the membrane across namespaces by providing object-likes through the membrane that could be used by the other realm to perform an operation that leaks values that are relevant. An example is shown by Table V-4 where a function imported from namespace foo is imported by namespace evil, and this namespace is calling that function with an array-like object.

TABLE V-4

```
// evil/lib/lib.js
import { navigateTo } from 'foo/navigate';
navigateTo('/x'); // works as expect
let leakedArgs;
   const poisonedUrl = {
   concat: function ( ) {
      leakedArgs = Array.prototype.slice(arguments);
      return Array.prototype.concat.call([ ], leakedArgs);
   },
};
navigateTo(poisonedUrl);
```

Assuming that the only thing that navigateTo does is concat what was passed into it with some extra secure querystring parameters, those are going to be leaked, because navigateTo is not validating that not protecting against poisoning. It should be noted that this poisoning mechanism is limiting, and it really depends on someone making a considerable dangerous mistake in their code. The rest of the poisoning mechanism is under control by the membrane.

VI. Example Implementations

Figure 5:
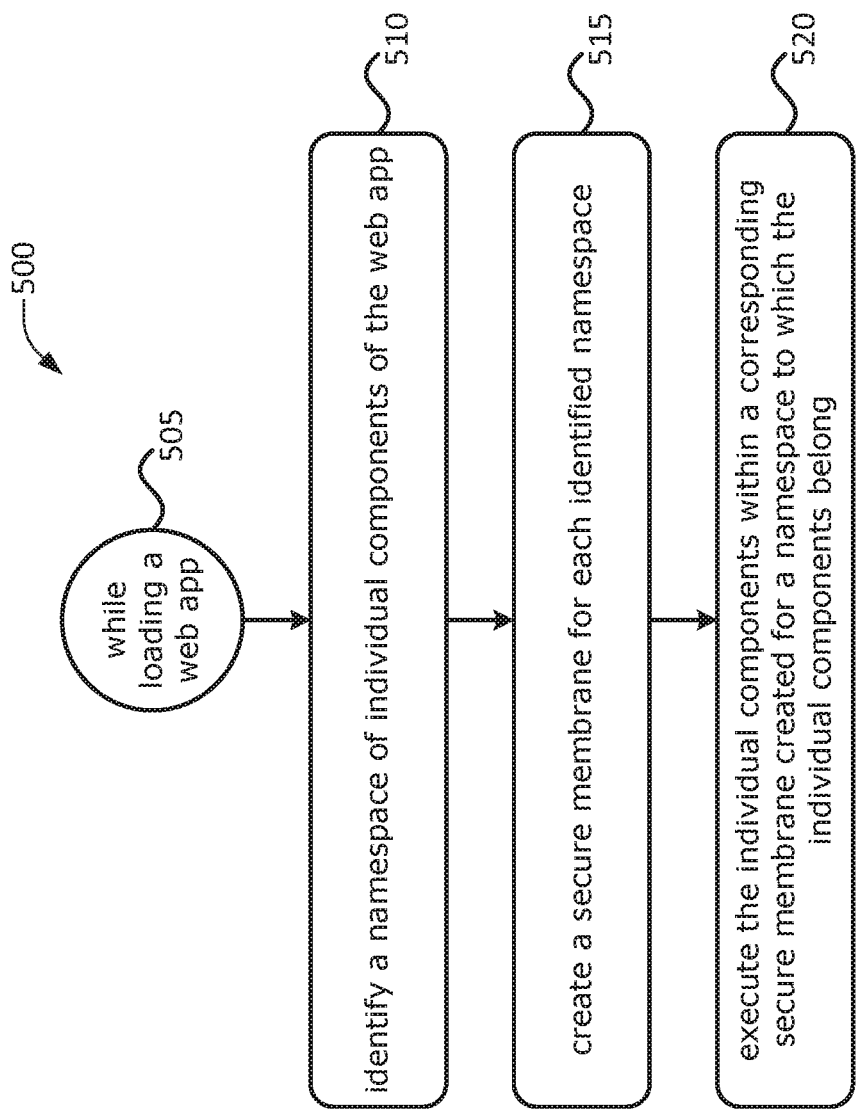
FIGS. 5-6 show various processes for practicing aspects of the embodiments discussed herein.
Figure 6:
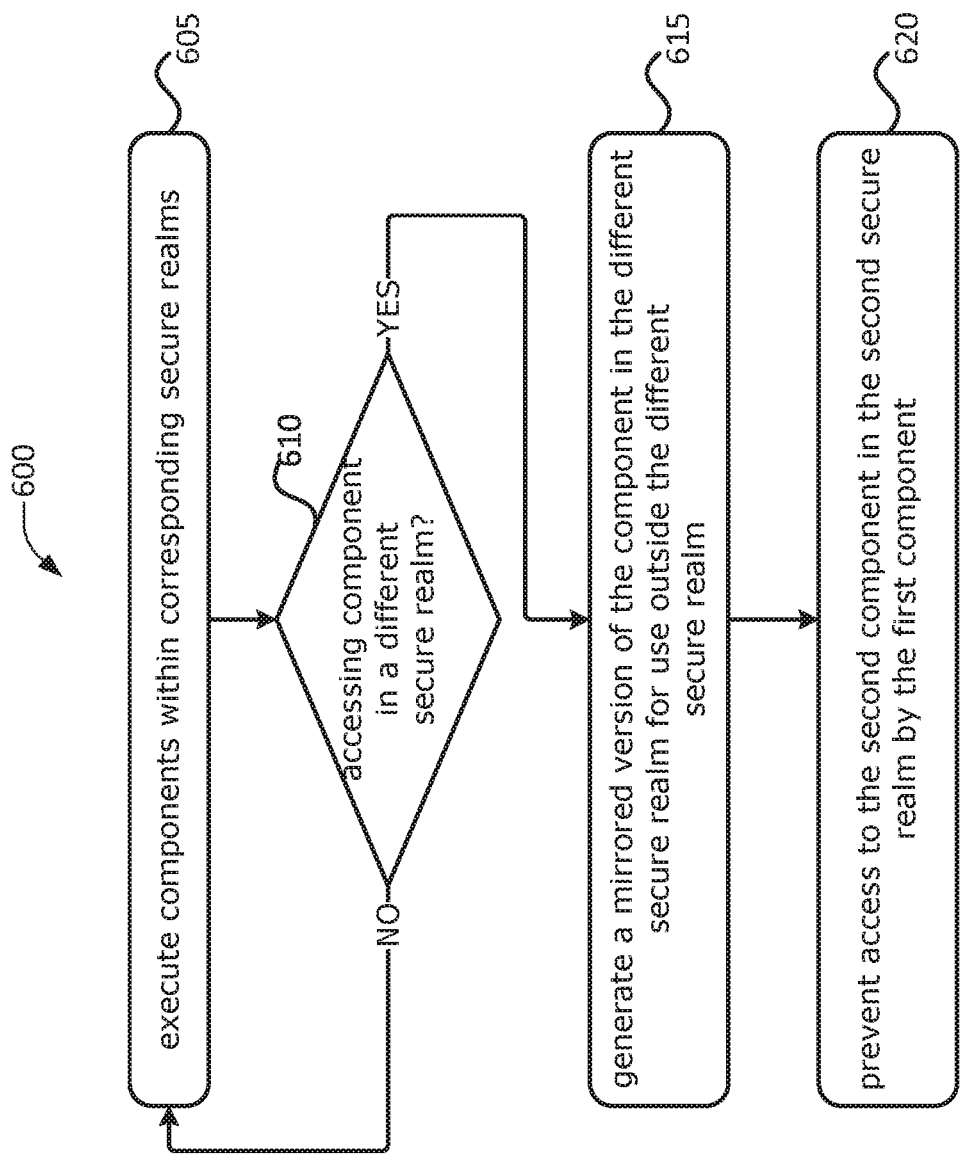

FIGS. 5-6 illustrate various processes for practicing aspects of the embodiments discussed herein. For illustrative purposes, the operations of the processes depicted by FIGS. 5-6 are described as being performed by a client computer system (e.g., user system 12) operating an app 301 shown and described with regard to FIG. 3. However, other computing devices may operate the processes depicted by FIGS. 5-6 in a multitude of implementations, arrangements, and/or environments. In embodiments, the client computer system 12 includes program code of the app 301 stored in a memory system 12B, which when executed by a processor system 12A, is to cause the computer system 12 to perform the various operations of processes 500 and 600. Additionally, the app 301 includes a scripting engine 302 that is operable to execute scripts of individual components 313 executing within the app 301. While particular examples and orders of operations are illustrated in FIGS. 5 and 6, in various embodiments, these operations may be re-ordered, separated into additional operations, combined, or omitted altogether.

FIG. 5 shows a process 500 for creating secure membranes according to various embodiments. Process 500 begins at operation 505, where a web app 303 is loading within the app 301, which includes a plurality of components 313. The remaining operations of process 500 may be executed/performed while the web app 303 is loading. At operation 510, the app 301 identifies a namespace of individual components 313 of the plurality of components 313 making up the web app 303. At operation 510, the app 301 creates a secure membrane for each identified namespace, and at operation 515, the app 301 executes the individual components 313 within a corresponding secure membrane created for a namespace to which the individual components 313 belong.

In some embodiments, creating the secure membranes at operation 510 involves the app 301 generating respective iframes for each identified namespace. This may include generating an HTML document to include an iframe tag for each identified namespace. In other embodiments, creating the secure membranes at operation 510 involves the app 301 generating/creating a realm object for each identified namespace.

In various embodiments, each of the secure membranes comprise a sandboxed realm isolated from other realms and one or more proxy objects with respective targets outside of the sandboxed realm. In some embodiments, the sandboxed realm is a first sandboxed realm, and the global objects outside of the first sandboxed realm are global objects within a second sandboxed realm different than the first sandboxed realm. In some embodiments, creating the secure membranes at operation 510 involves the app 301 remapping global references in the sandboxed realm to be the one or more proxy objects created in the sandboxed realm. In these embodiments, remapping the global references includes replacing function and object properties of global objects of the sandboxed realm with proxied counterparts, the proxied counterparts having respective targets to global objects outside of the sandboxed realm. This may involve remapping property descriptors of a secure globalThis object to property descriptors of a raw globalThis object.

In some embodiments, creating the secure membranes at operation 510 involves the app 301 generating a membrane target object of a raw object, and populating the membrane target with property descriptors and proxy prototype values of raw values of the raw object. Additionally, creating the secure membranes at operation 510 involves the app 301 mapping property descriptors of the membrane target object to the property descriptors of the raw object. The mapping may include replacing getters, setters, and values for function and object properties of the membrane target object with proxied counterparts. The membrane target object may be a secureGlobalThis object and the raw object may be a rawGlobalThis object. Additionally or alternatively, shadow realm object graphs of the membrane target is lazily populated when a first proxy trap is triggered.

After performance of operation 520, process 500 may end or repeat as necessary. Additionally, the components within the created secure membranes may communication with one another according to process 600 of FIG. 6.

FIG. 6 shows a process 600 for cross namespace communication according to various embodiments. Process 600 begins at operation 605 where the app 301 executes individual components 313 within corresponding secure realms according to the namespace to which the individual components 313 belong. Each secure realm is created for each namespace of each component 313 making up the web app 303. For example, a first component 313 associated with a first namespace may operate within a first secure realm created for the first namespace, a second component 313 associated with a second namespace may operate within a second secure realm created for the second namespace, and so forth. The secure realms may be the same or similar to the secure membranes discussed previously.

At operation 610, the app 301 determines whether any components 313 are attempting to access another component 313 in a different secure realm, for example, whether the first component 313 in the first secure realm is attempting to access the second component 313 in the second secure realm. If no components 313 are attempting to access components 313 outside of their secure realms, then the app 301 loops back to operation 605 to continue executing/operating the components 313 in their respective secure realms. If a component 313 is attempting to access another component 313 outside of its secure realm, then the app 301 at operation 615 generates a mirrored version of the component 313 in the different secure realm for use outside the different secure realm. For example, when the first component 313 in the first secure realm is attempting to access the second component 313 in the second secure realm, the app 301 may generate a mirrored version of the second component 313 for use in the first secure realm by the first component 313. At operation 620, the app 301 prevents (or continues to prevent) access to components 313 outside of their secure realms. For example, the app 301 may prevent (or continues to prevent) the first component 313 from accessing the second component 313 in the second secure realm. After performance of operation 620, process 600 may end or repeat as necessary.

In some embodiments, the attempt to access another component 313 in a different secure realm involves extending an intrinsic element in a root realm via a secure proxy. In some embodiments, the attempt to access another component 313 in a different secure realm involves importing the other component 313 into a secure realm via a secure proxy having a target in the root realm.

In some embodiments, generating the mirrored version of the component at operation 615 involves the app 301 importing functionality of the component 313 into the secure realm of the component 313 attempting to access that component 313. Additionally or alternatively, generating the mirrored version of the component at operation 615 involves the app 301 exporting the second component 313 outside of its secure realm via a reverse proxy having a target in the root realm. This may involve extending a class definition in the secure realm attempting to access that component 313 via the root realm. In some embodiments, the mirrored version of a component 313 is a secure proxy of a reverse proxy of that component 313. In some embodiments, the mirrored version of the component is provided to the accessing secure realm using secure proxies and reverse proxies.

Process 600 may also involve operating a root realm for cross namespace communication, where the root realm obtains an object from the first secure realm via a first proxy implemented by the first secure realm, wrapping the object to create a second proxy implemented by the root realm; and providing the wrapped object to the second secure realm via the second proxy. The first proxy may be a first secure proxy implemented by the first secure realm, and the second proxy may be a second secure proxy implemented by the root realm. Additionally or alternatively, the first proxy may be a first reverse proxy from the perspective of the root realm, and the second proxy may be a second reverse proxy from a perspective of the second secure realm. In some embodiments, the object is created by the first secure realm and wrapped by the first secure realm to create the first proxy. Additionally or alternatively, the first secure realm may create a base container that extends a base container definition from the root realm, and the extended base container is accessible in the first secure realm via the first secure proxy. The component may be a secure proxy of a reverse proxy of a target component defined in the second secure realm. Additionally or alternatively, the second secure realm may create a specialized container that extends a specialized container definition that comes from the first secure realm via the root realm. The specialized container may be a secure proxy of a reverse proxy of the base container defined in the first secure realm.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an app server providing a front end for an on-demand database service capable of supporting multiple tenants, the present implementations are not limited to multi-tenant databases or deployment on app servers. Implementations may be practiced using other database architectures, for example, ORACLE®, DB2® by IBM®, and the like without departing from the scope of the implementations claimed.

It should also be understood that some of the disclosed implementations can be embodied in the form of various types of hardware, software, firmware, middleware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Python, PyTorch, NumPy, Ruby, Ruby on Rails, Scala, Smalltalk, Java™, C++, C#, "C", Kotlin, Swift, Rust, Go (or "Golang"), ECMAScript, JavaScript, TypeScript, Jscript, ActionScript, Server-Side JavaScript (SSJS), PHP, Pearl, Lua, Torch/Lua with Just-In Time compiler (LuaJIT), Accelerated Mobile Pages Script (AMPscript), VBScript, JavaServer Pages (JSP), Active Server Pages (ASP), Node.js, ASP.NET, JAMscript, Hypertext Markup Language (HTML), extensible HTML (XHTML), Extensible Markup Language (XML), XML User Interface Language (XUL), Scalable Vector Graphics (SVG), RESTful API Modeling Language (RAML), wiki markup or Wikitext, Wireless Markup Language (WML), Java Script Object Notion (JSON), Apache® MessagePack™, Cascading Stylesheets (CSS), extensible stylesheet language (XSL), Mustache template language, Handlebars template language, Guide Template Language (GTL), Apache® Thrift, Abstract Syntax Notation One (ASN.1), Google® Protocol Buffers (protobuf), Bitcoin Script, EVM® bytecode, Solidity™, Vyper (Python derived), Bamboo, Lisp Like Language (LLL), Simplicity provided by Blockstream™, Rholang, Michelson, Counterfactual, Plasma, Plutus, Sophia, Salesforce® Apex®, Salesforce® Visualforce®, Salesforce® Lightning@, Salesforce® Wave™ Dashboard Designer, Salesforce® Force.com® IDE, Android Studio™ integrated development environment (IDE), Apple® iOS® software development kit (SDK), and/or any other programming language or development tools including proprietary programming languages and/or development tools. Furthermore, some or all of the software components or functions described herein can utilize a suitable querying language to query and store information in one or more databases or data structures, such as, for example, Structure Query Language (SQL), object query language (OQL), Salesforce® OQL (SOQL), Salesforce® object search language (SOSL), Salesforce® analytics query language (SAQL), and/or other query languages.

The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices.

Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system, or other computing device, includes a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

The invention claimed is:

1. One or more non-transitory computer-readable media (NTCRM) comprising instructions, wherein execution of the instructions is operable to cause a client computing system to:
while loading a web application (app) including a plurality of components,
identify a set of namespaces associated with the plurality of components, wherein each component of the plurality of components corresponds to at least one namespace of the set of namespaces,
create a set of membranes, wherein each secure membrane in the set of secure membranes is created for a corresponding namespace in the set of namespaces, each secure membrane includes a set of proxy objects, and each proxy object in the set of proxy objects has a corresponding target object outside of its secure membrane, and
execute individual components of the plurality of components within corresponding ones of the set of secure membranes to which the individual components belong.

2. The one or more NTCRM of claim 1, wherein, to create the secure membrane, execution of the instructions is operable to cause the client computing system to:
generate an inline frame (iframe) for each identified namespace.

3. The one or more NTCRM of claim 2, wherein, to create the iframe for each identified namespace, execution of the instructions is operable to cause the client computing system to:
generate a Hypertext Markup Language (HTML) document to include an iframe tag for each namespace.

4. The one or more NTCRM of claim 1, wherein, to create the secure membrane, execution of the instructions is operable to cause the client computing system to:
create a realm object for each identified namespace.

5. The one or more NTCRM of claim 1, wherein each secure membrane comprises a sandboxed realm isolated from other realms and the set of proxy objects in each secure membrane accesses respective target objects outside of the sandboxed realm.

6. The one or more NTCRM of claim 5, wherein, to create the secure membrane, execution of the instructions is operable to cause the client computing system to:
remap global references in the sandboxed realm to be the one or more proxy objects created in the sandboxed realm, wherein the remapping of the global references in the sandboxed realm includes replacement of function and object properties of global objects of the sandboxed realm with proxied counterparts, wherein the proxied counterparts have respective targets to global objects outside of the sandboxed realm.

7. The one or more NTCRM of claim 1, wherein a manifest file for the individual components defines the namespace of the individual components.

8. One or more non-transitory computer-readable media (NTCRM) comprising instructions, wherein execution of the instructions is operable to cause a client computing system to:
while loading a web application (app) including a plurality of components,
identify a namespace of individual components of the plurality of components,
create a secure membrane for each identified namespace, wherein the secure membrane comprises a sandboxed realm isolated from other realms and one or more proxy objects with respective targets outside of the sandboxed realm, and to create the secure membrane, execution of the instructions is operable to cause the client computing system to:
remapping global references in the sandboxed realm to be the one or more proxy objects created in the sandboxed realm, wherein, to remap the global references, execution of the instructions is operable to cause the client computing system to:
replace function and object properties of global objects of the sandboxed realm with proxied counterparts, wherein the proxied counterparts have respective targets to global objects outside of the sandboxed realm; and
execute the individual components within a corresponding secure membrane created for a namespace to which the individual components belong.

9. The one or more NTCRM of claim 8, wherein the global objects of the sandboxed realm are respective secure globalThis objects, the global objects of outside of the sandboxed realm are respective raw globalThis objects, and execution of the instructions is operable to cause the client computing system to:
remap property descriptors of the secure globalThis object to property descriptors of a raw globalThis object.

10. The one or more NTCRM of claim 8, wherein the sandboxed realm is a first sandboxed realm, and the global objects outside of the first sandboxed realm are global objects within a second sandboxed realm different than the first sandboxed realm.

11. The one or more NTCRM of claim 10, wherein execution of the instructions is operable to cause the client computing system to:
operate a first component and a second component of a web application (app) within the first sandboxed realm and within the second sandboxed realm, respectively;
when script of the first component is to access the second component in the second sandboxed realm, generate a mirrored version of the second component for use in the first sandboxed realm by the first component, and prevent access to the second component in the second sandboxed realm by the first component.

12. A client computing system comprising:

a communication system to connect with a server computing system to establish a single page web application (SPA), the SPA including a plurality of components;

a memory system to store program code of a client app; and a processor system communicatively coupled with the memory system and the communication system, the processor system is to operate the client app to:

while loading the SPA, identify a namespace of individual components of the plurality of components including a first namespace of a first component of the plurality of components and a second namespace of a second component of the plurality of components, create a secure realm for each identified namespace including a first secure realm for the first namespace and a second secure realm for the second namespace;

execute the first component within the first secure realm;

execute the second component within the second secure realm isolated from the first secure realm; and when the first component is to access the second component in the second secure realm, generate a mirrored version of the second component for use in the first secure realm by the first component, and prevent access to the second component in the second secure realm by the first component.

13. The client computing system of claim 12, wherein, to generate the mirrored version of the second component, the processor system is to operate the client app to:

import functionality of the second component into the first secure realm.

14. The client computing system of claim 12, wherein the processor system is to operate the client app to:

operate the first component to extend an intrinsic element in a root realm via a secure proxy, the root realm being isolated from the first secure realm and the second secure realm.

15. The client computing system of claim 14, wherein the processor system is to operate the client app to:

while loading the web app, identify a first namespace of the first component and a second namespace of the second component, and create the first and second secure realms for the first and second identified namespaces, respectively.

16. The client computing system of claim 15, wherein, to create the first and second secure realms, the processor system is to operate the client app to:

generate a first inline frame (iframe) within the web app for the first namespace; and generate a second iframe within the web app for the second namespace.

17. The client computing system of claim 16, wherein, to create the first and second secure realms, the processor system is to operate the client app to:

remap global references in the first secure realm to be one or more first proxy objects with respective targets in the root realm; and remap global references in the second secure realm to be one or more second proxy objects with respective targets in the root realm.

18. The client computing system of claim 14, wherein the processor system is to operate the client app to:

operate the first component to import the second component into the first secure realm via a secure proxy having a target in the root realm.

19. The client computing system of claim 18, wherein the processor system is to operate the client app to:

operate the second component to export the second component to the first secure realm via a reverse proxy having a target in the root realm.

20. The client computing system of claim 19, wherein, to export the second component to the first secure realm, the processor system is to operate the client app to:

operate the second component to extend a class definition in the first secure realm via the root realm.

21. The client computing system of claim 12, wherein the mirrored version of the second component is a secure proxy of a reverse proxy of the second component in the second secured realm.

22. The client computing system of claim 12, wherein a manifest file for the individual components defines the namespace of the individual components.

* * * * *